United States Patent [19]

Barry

[11] 4,065,006
[45] Dec. 27, 1977

[54] CONTAINER SIDE-TRANSFER SYSTEM

[76] Inventor: Leonard D. Barry, 19300 Pennington Drive, Detroit, Mich. 48221

[21] Appl. No.: 591,101

[22] Filed: June 27, 1975

Related U.S. Application Data

[63] Continuation of Ser. No. 428,873, Dec. 27, 1973, abandoned.

[51] Int. Cl.² .................................................. B61K 1/00
[52] U.S. Cl. ................................. 214/42 R; 104/18; 104/20; 214/38 C; 214/515
[58] Field of Search ................. 214/42 R, 43, 515, 58, 214/59 R, 61, 62 R, 62 A, 42; 104/18, 20, 29

[56] References Cited

U.S. PATENT DOCUMENTS

| | | | |
|---|---|---|---|
| 3,416,684 | 12/1968 | Barry | 214/43 X |
| 3,550,224 | 12/1970 | Gram et al. | 214/62 A |

Primary Examiner—Robert G. Sheridan

[57] ABSTRACT

This invention improves upon my side transfer system and devices of my U.S. Pat. Nos. 3,416,684, 3,483,829, and 3,484,002 wherein the improvement comprises transfer devices actuated by a cam rider or riders on transfer station car engaging a cam track along the transfer run and control of the transfer devices to insure safety. Side transfer cars couple selected pedestal cars in a passing train and have transfer arms that reach under one or more containers or trailers of various lengths to lift on or off between the parallelrunning sidecouple car according to train direction over a change of elevation in the cam track. A three grooved cam wheel is lifted from cam rail to cam rail to right or left to carry a second cam rider over a similar cam track plan to operate arms of a second transfer device is coordination to transfer a long container with two transfer devices. Optionally key-pin clutch-couplings can synchronize the transfer devices to operate together to transfer one long container or separately engage or not to operate either or both transfer devices according to the containers to be transferred. Features are added so the transfer devices can be made to load and unload cars, trailers, or storage spots while standing still. Various station facilities are provided to cooperate to increase the utility of this system, including a gantry crane which reaches over railway cars from side for transfer of the containers.

22 Claims, 98 Drawing Figures

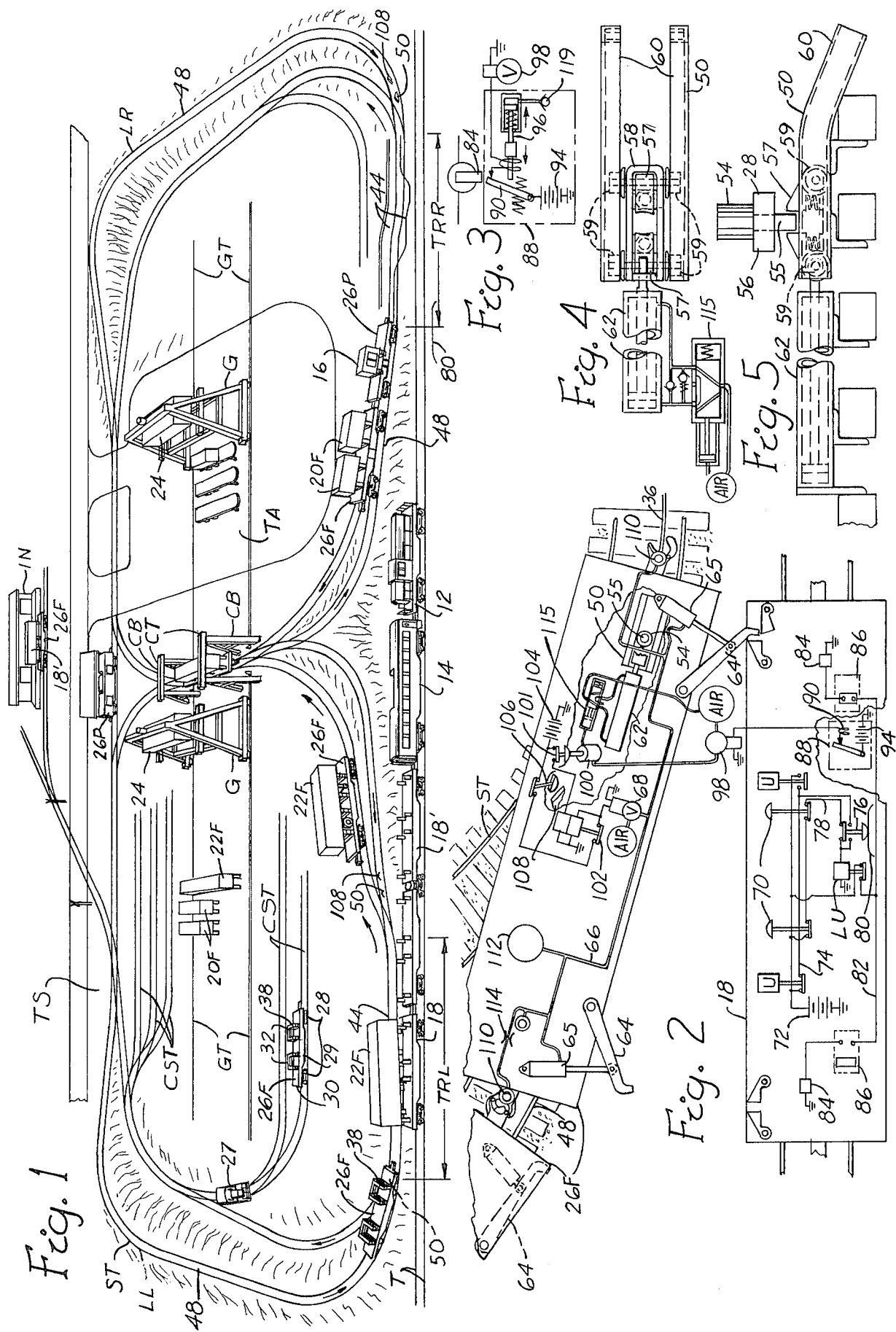

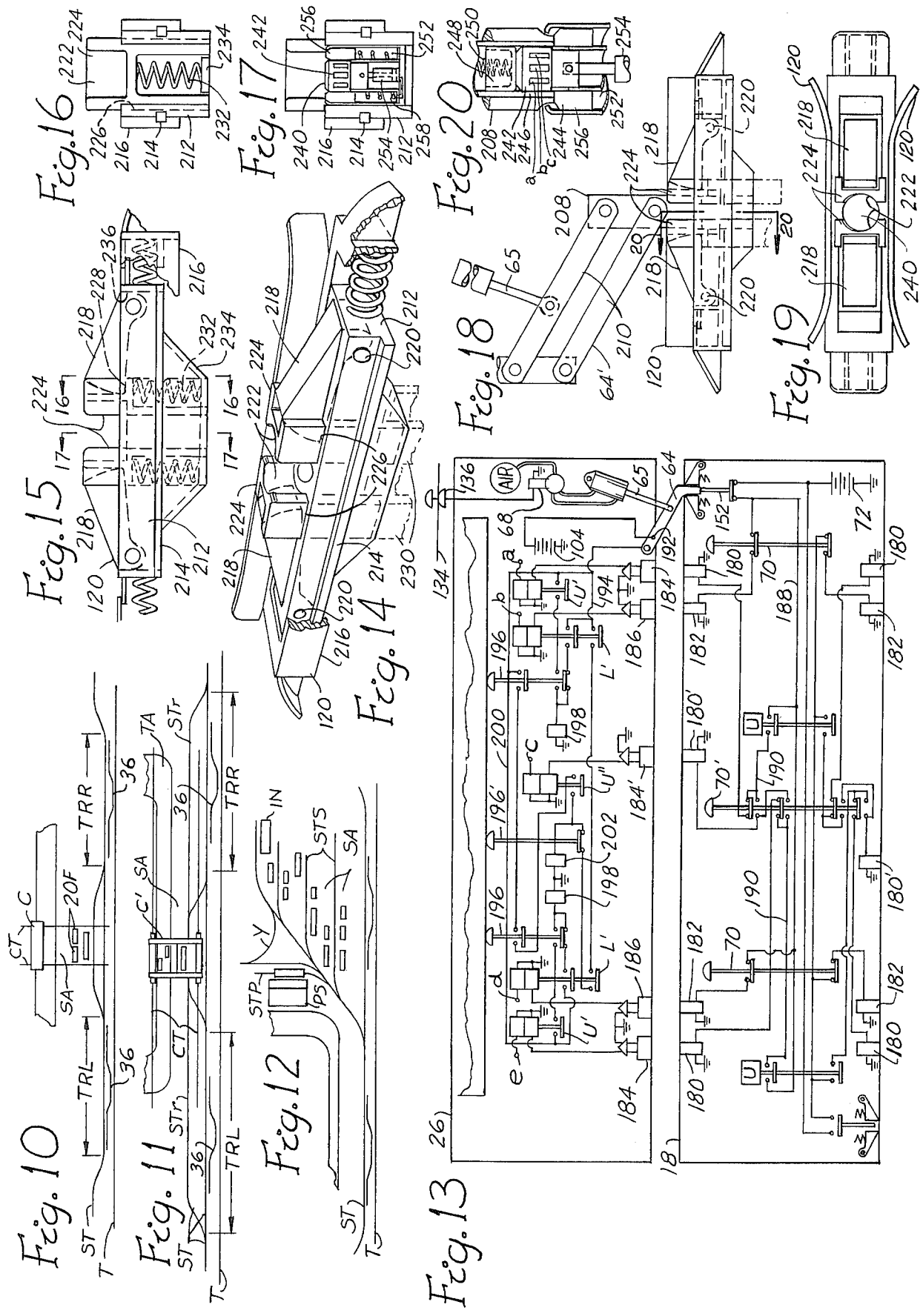

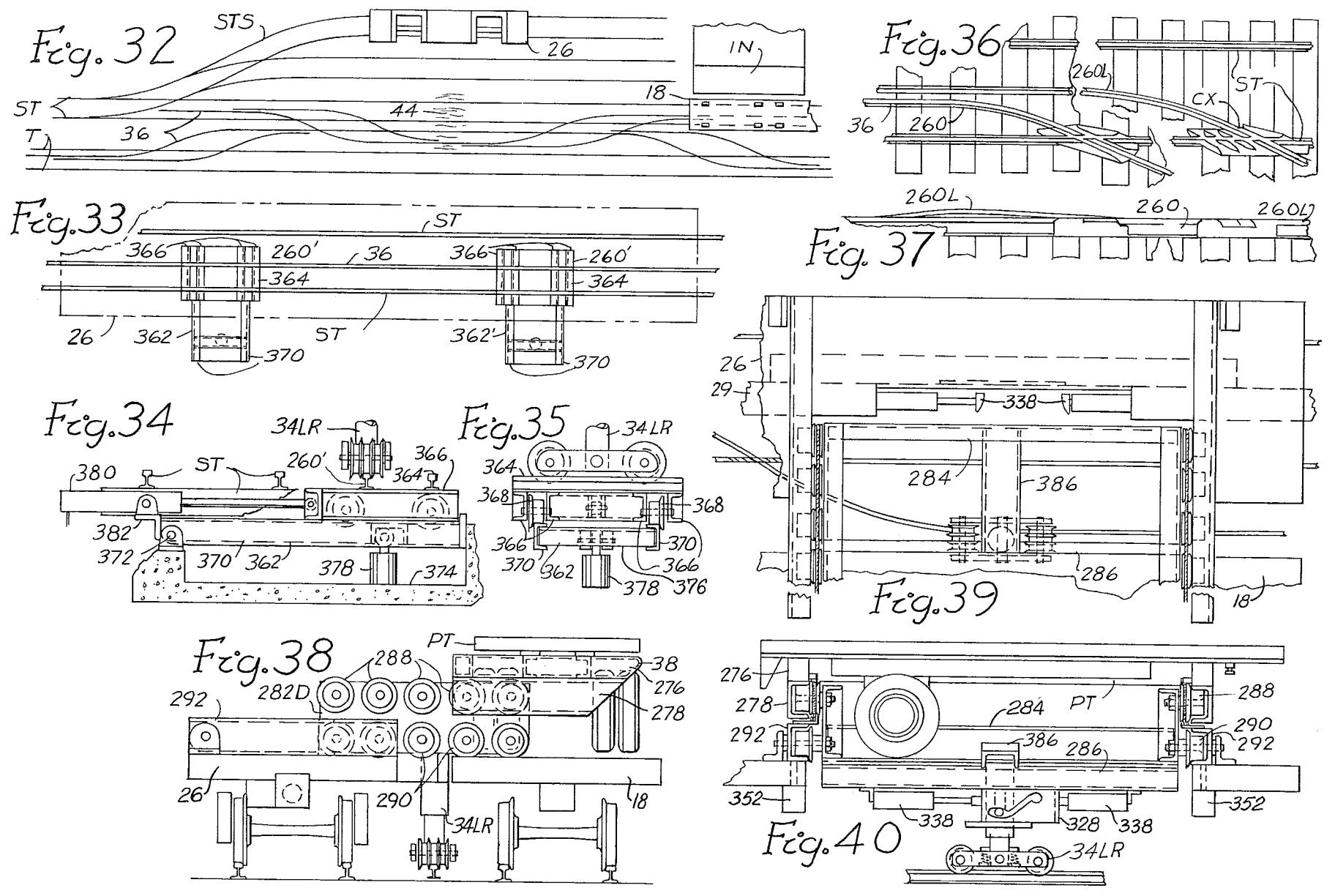

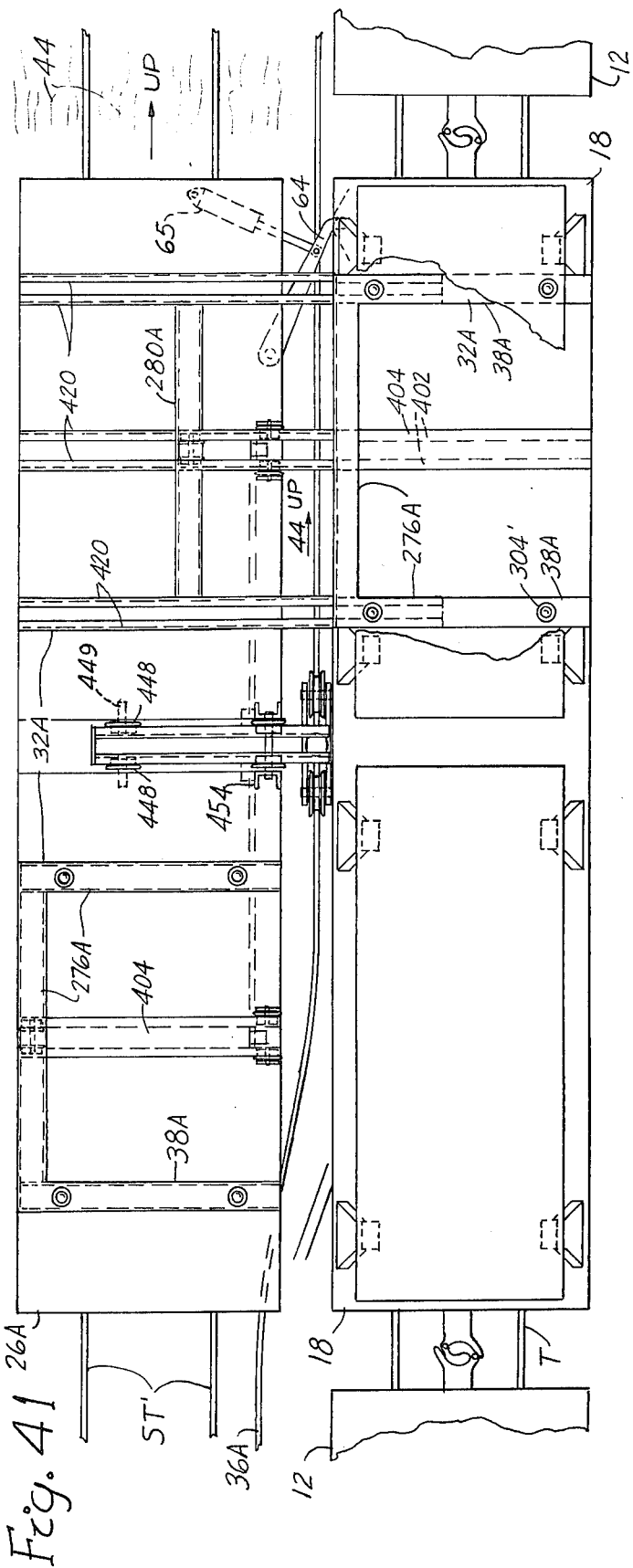
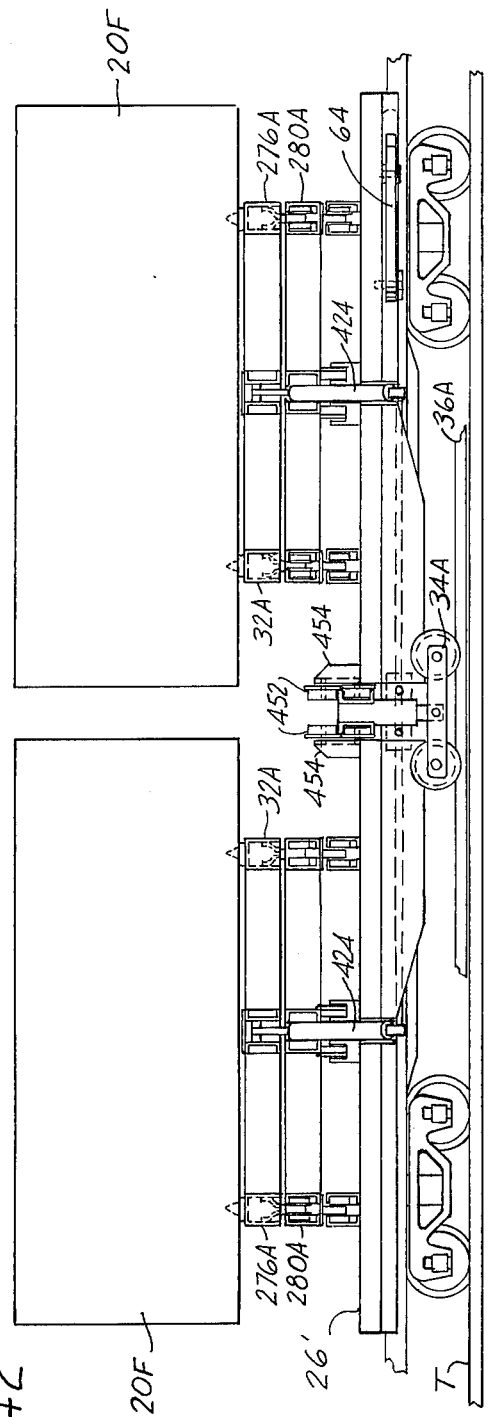
Fig. 41
Fig. 42

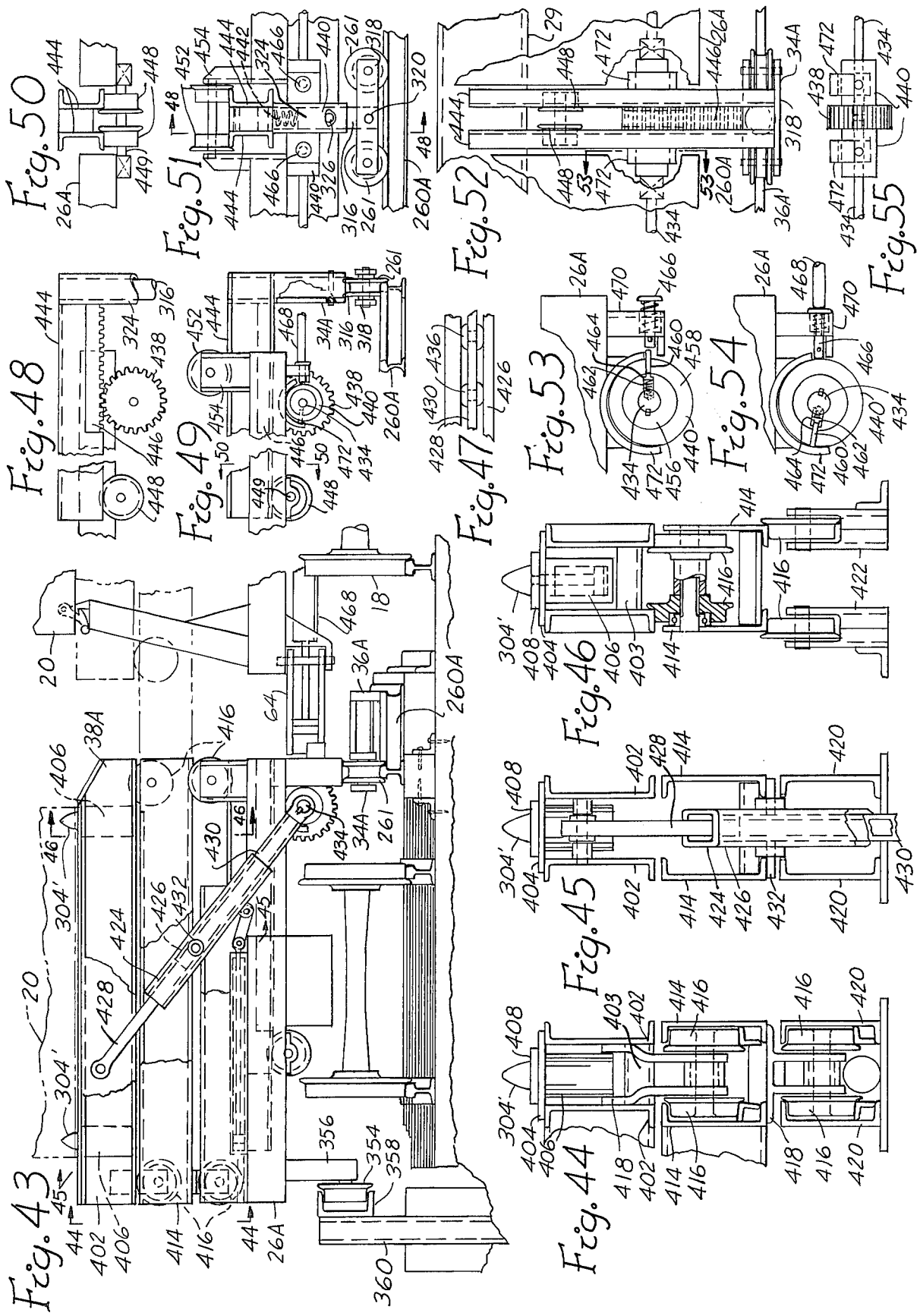

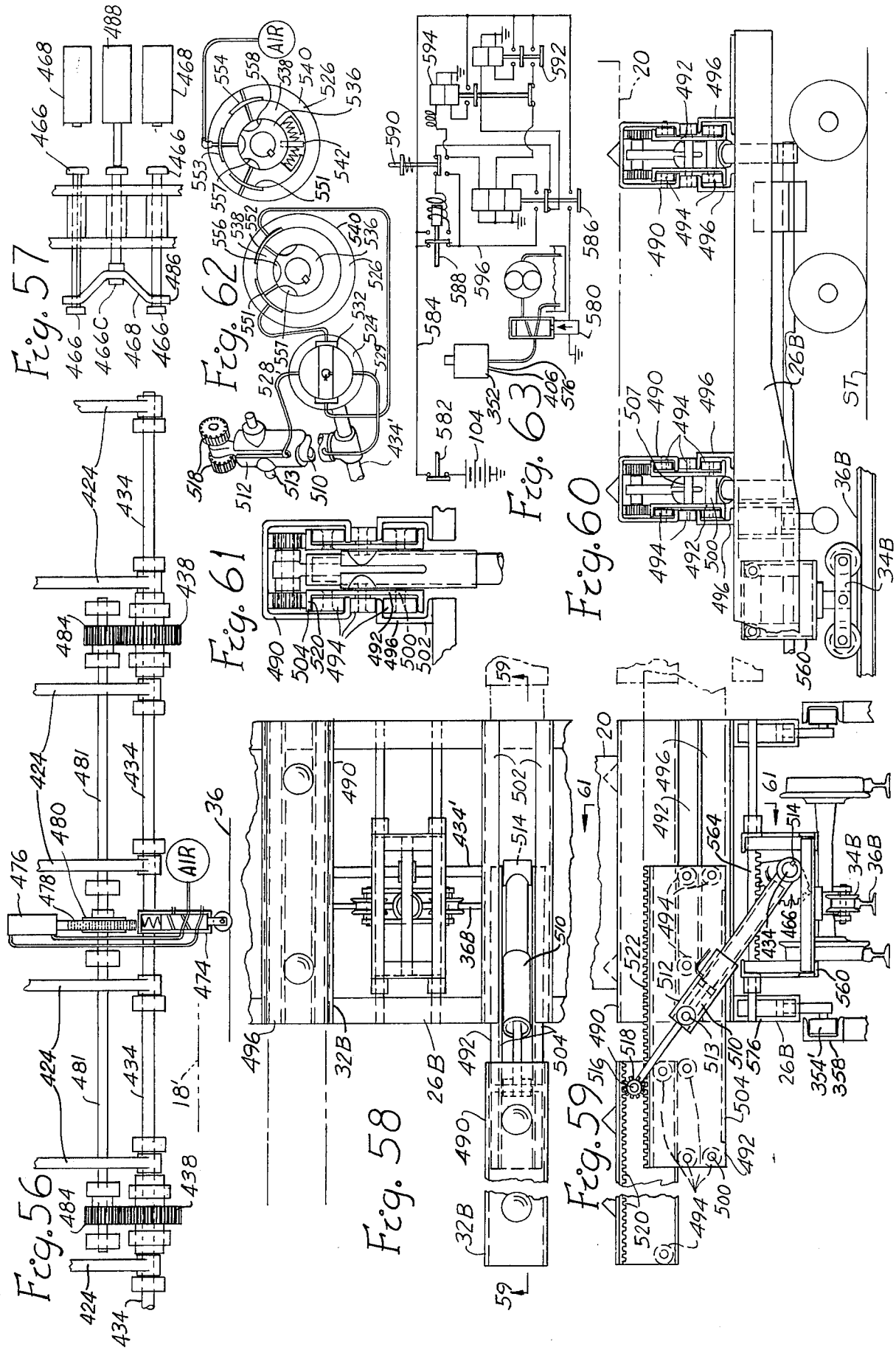

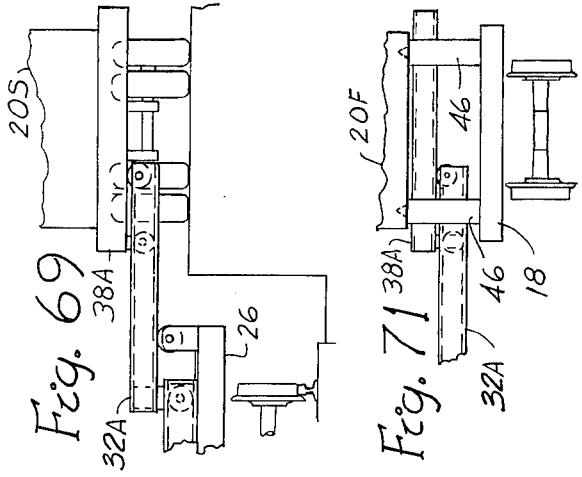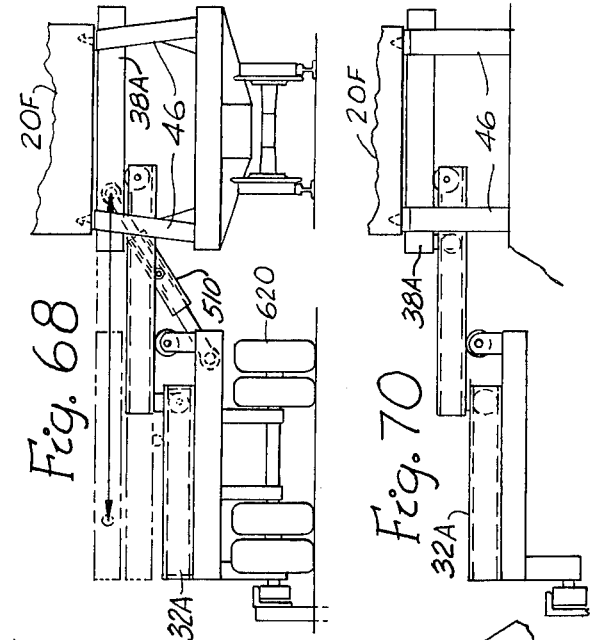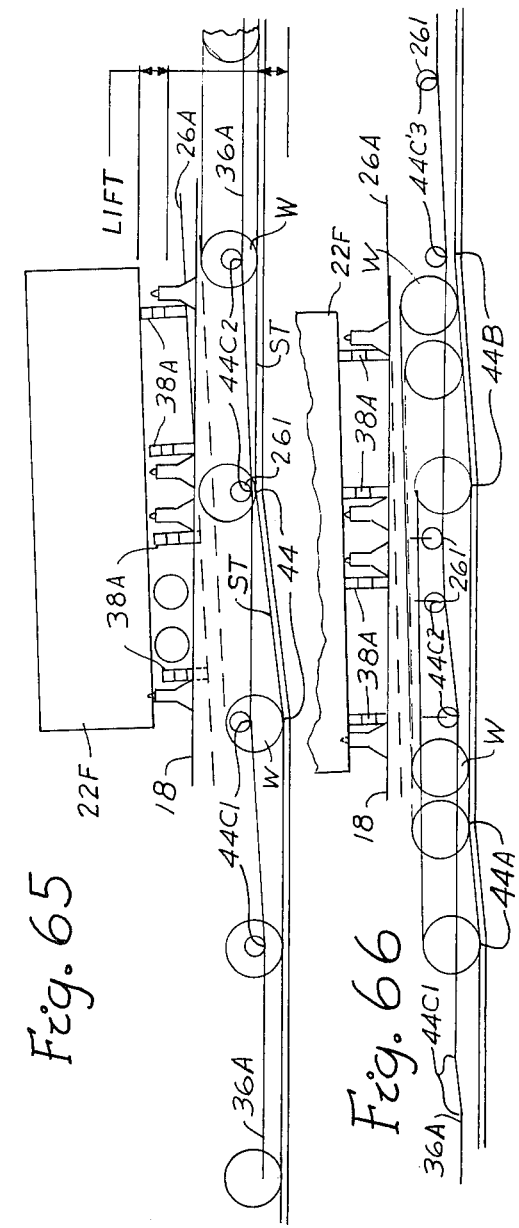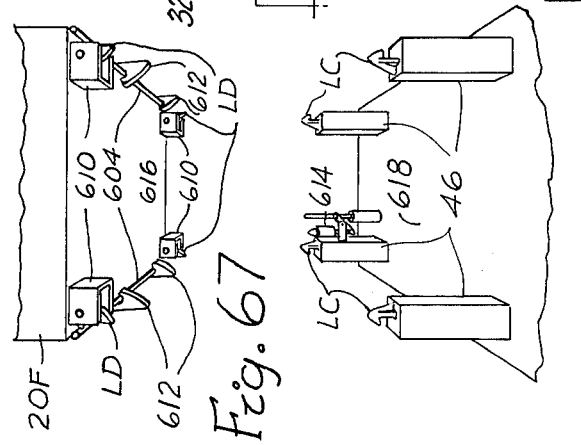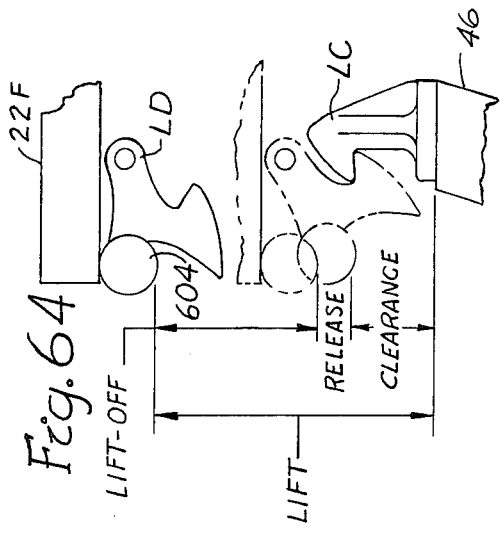

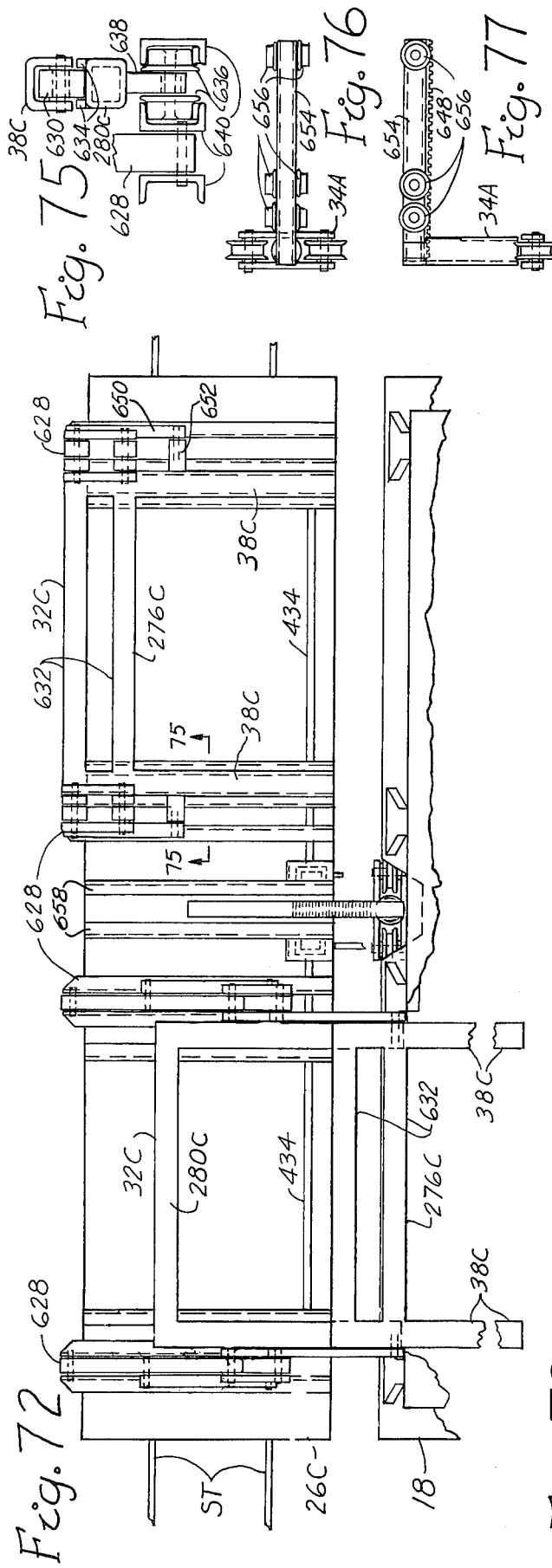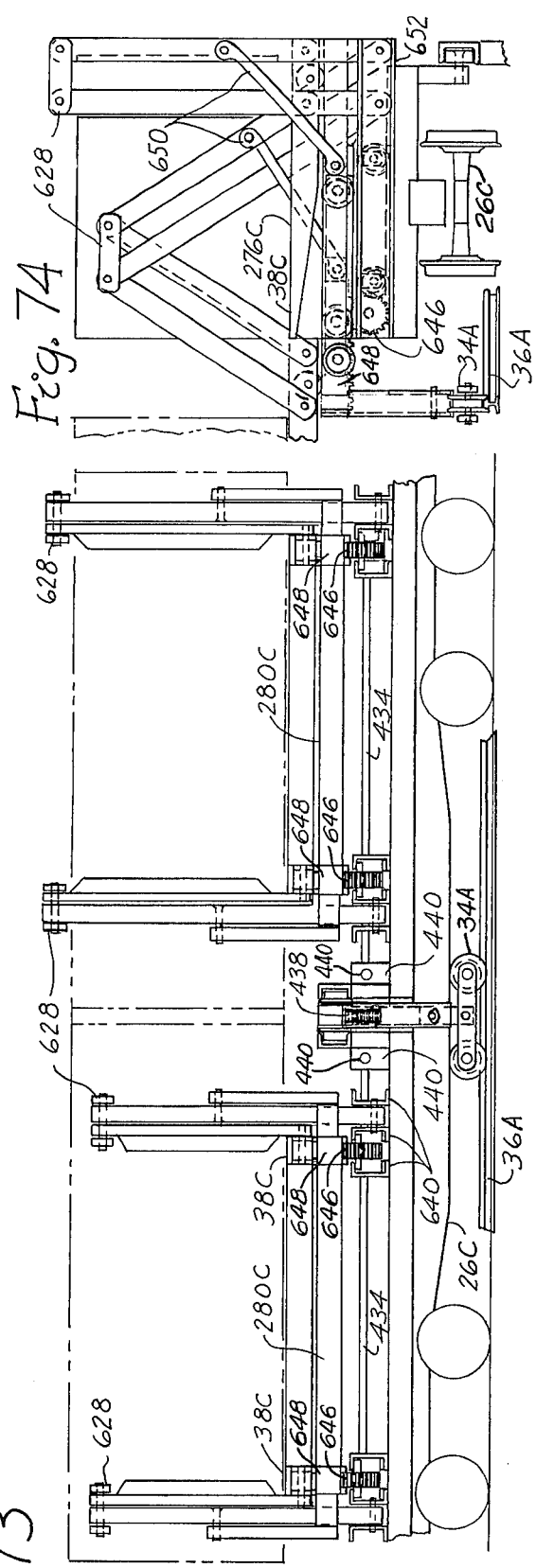

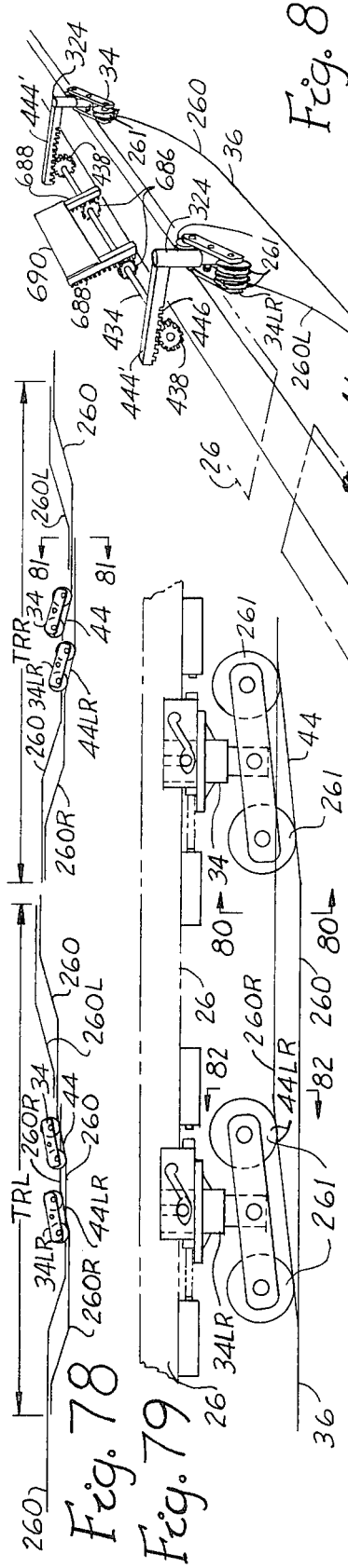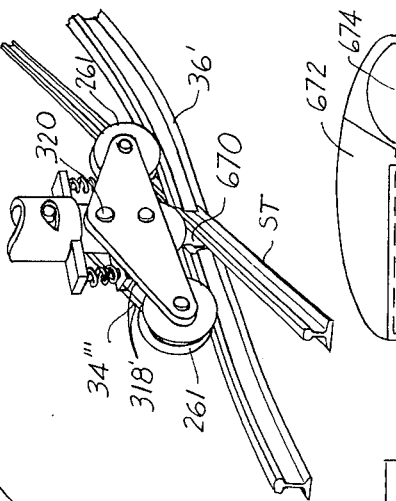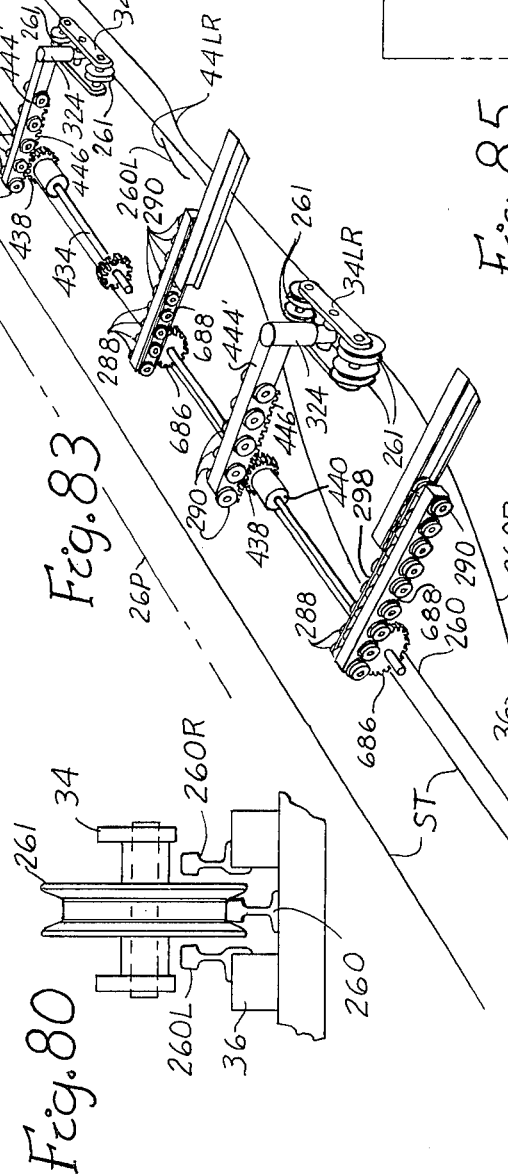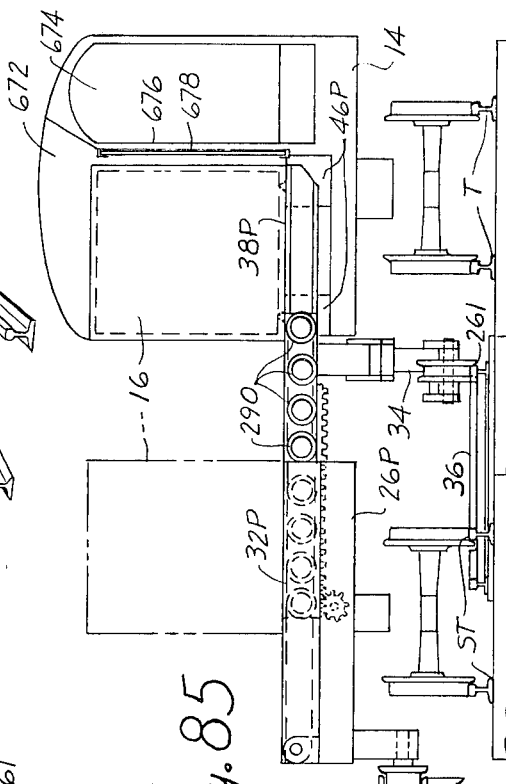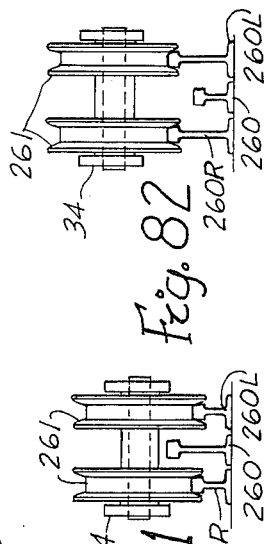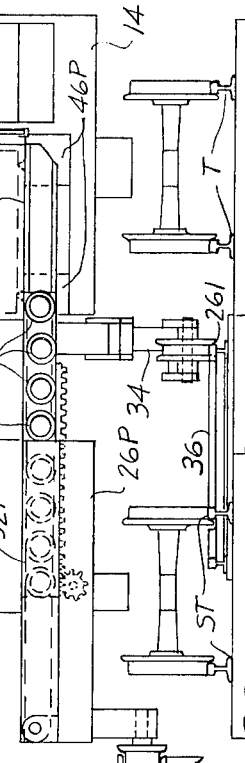

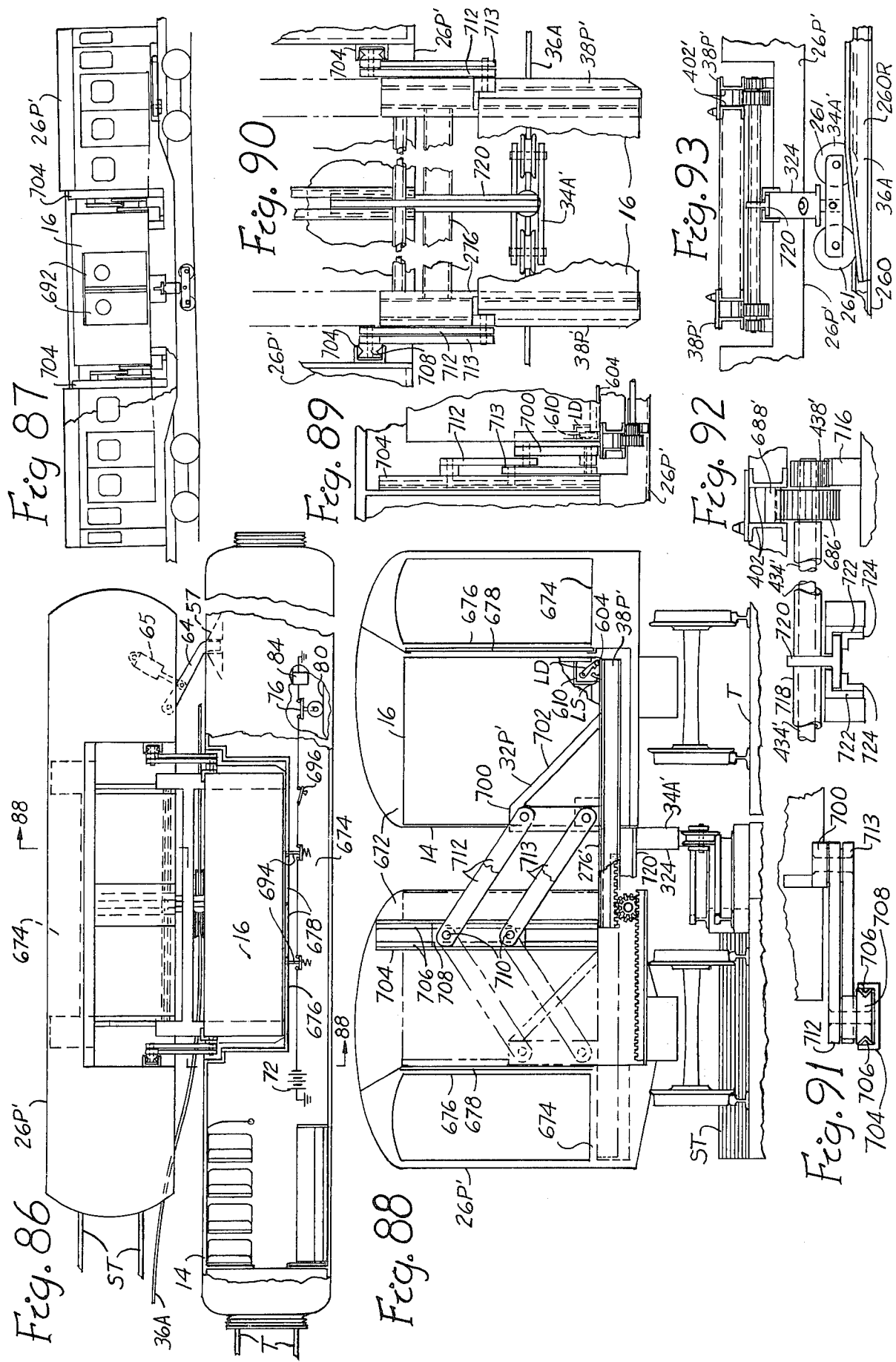

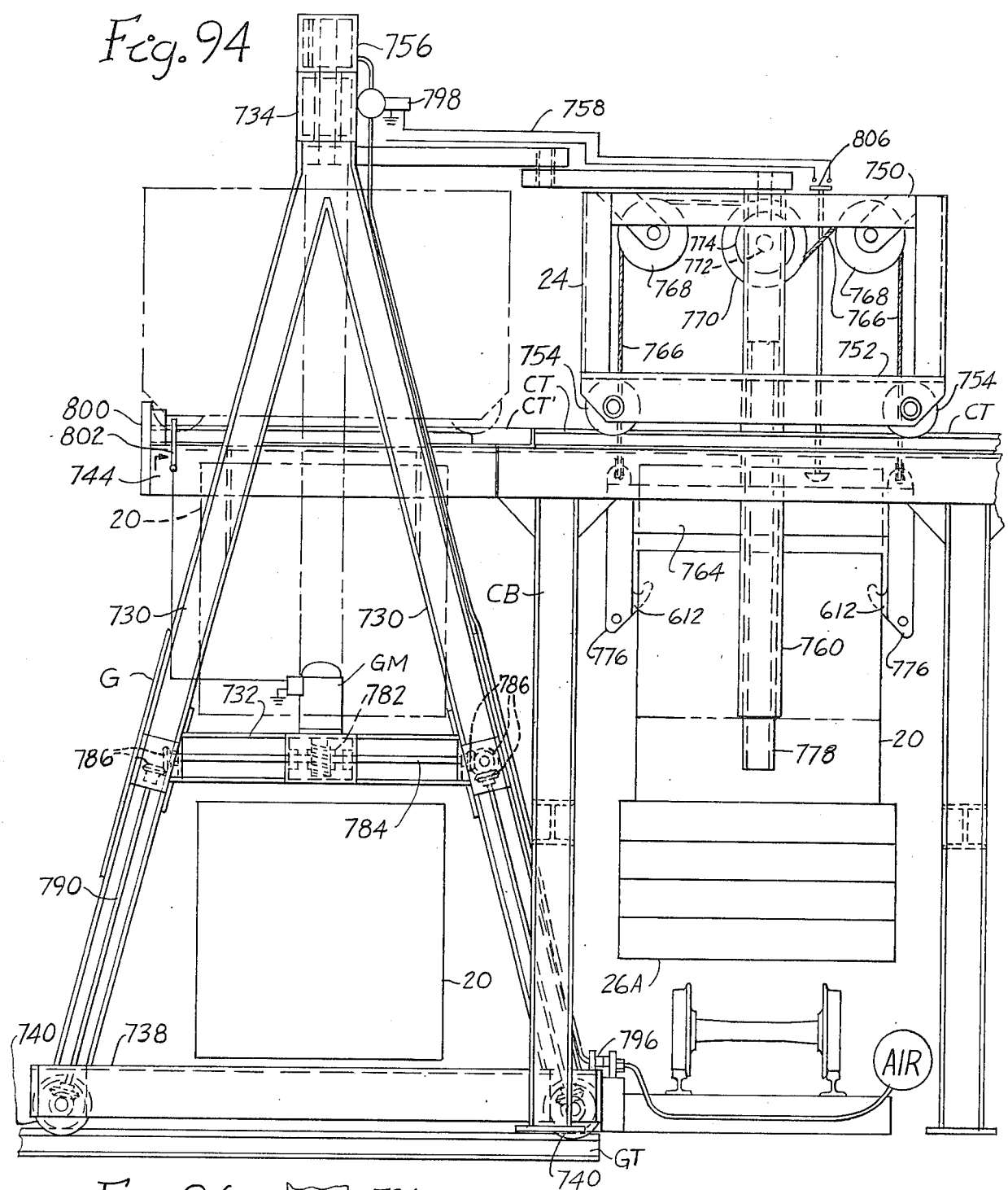
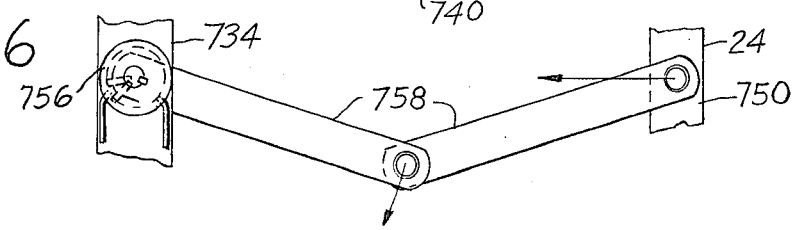
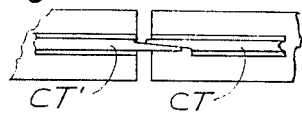

CONTAINER SIDE-TRANSFER SYSTEM

This is a continuation, of application Ser. No. 428,873 filed Dec. 27, 1973, now abandoned.

This application applies cam transfer of containers to side transfer, see my Ser. No. 360,527 Pat. No. 3,939,775 for cam actuated vertical transfer.

This is a typical way freight problem: siding branching forward has car to be added to train and train has car in middle for siding. Present practice: train stops ahead of switch to siding, switch thrown, train uncoupled, engine enters siding, couples car, pulls it back out of siding, recouples train, backs up, train behind car for delivery, switch thrown for train to move by siding with man riding car for siding, car is uncoupled on fly far enough ahead of switch to be slowed so switch can be thrown after forward end of train has passed but before car cut reaches switch, car is braked by man riding it to stop in siding, switch thrown back, train backed up, recoupled to rear cars, train proceeds forward with car in front of engine to a passing track before forward car is switched behind engine. This is very time consuming.

It is an object of this invention to provide so simple and inexpensive a bytrack with car that instead of switching cars into sidings loads will be shipped in containers transferred to and from trains that pass the bytrack, thus eliminating need for switches to factory and warehouse sidings and greatly reducing the cost to deliver the goods. In simplest form the containers are delivered to the car on the bytrack in one direction and after unloading or loading or both they are positioned for train to receive the containers back on a return trip; thus on branch lines the containers are brought from connecting end out and transferred off along the branch. Those ready to return (either loaded or empty) are picked up on the way back all nonstop out and back along the branch, thus greatly reducing branch line operating time. Stations along lines which have connection at each end should preferably have two bytrack transfer runs, one for delivery of container to trains and one for receiving containers according to direction train is running or two directional transfer between station cars and train so station can receive containers from either end of the line instead of on a return or backup run of the train. Nevertheless even a backup runby to effect transfer would be an improvement over the present switching practices.

A reversed method for operating these cars especially suited for branch line would be to use the station cars with transfer devices in the train to transfer containers to and from pedestal or pedestal on flat cars at the stations and industries. Thus the transfer devices would find fuller use in the trains rather than leaving that investment at the stations.

Some objects of this invention are to provide simple and low cost transfer means for this, to utilize train movement to effect transfer, to provide safe side coupling means and transfer means for this, to provide facilities for large stations to handle large quantities of containers efficiently with storage of containers between trains and useable with my automatic container routing, storage and station car loading and unloading controls, to side transfer containers or trailers of various lengths automatically on the railroads, to store containers and transport them on the pedestal cars disclosed in my U.S. Pat. Nos. 3,528,569 and 3,677,194, to provide a low cost side transfer system which eliminates overhead tracks except for gantry crane extension track over station track, to utilize train movement to operate the transfer devices yet has the transfer devices selectably operable with safety check of loading and for transfer of selected containers, to extend side coupling from the station cars to reduce danger of protruding from the railroad car and to control the side coupling by signals between the cars, to provide passenger and/or freight container transfer runs of this invention and in same train, to replace each siding with a track not necessarily connected to rail line for receiving and sending containers at industries and warehouses, to enable the station car mounted transfer devices to load and unload itself while standing, to reduce cost of station equipment for container transfer, to provide means to position and release the station cars for the transfer run coupled to a particular railway car, to provide improved station layouts and selection of components to reduce the station area or better utilize the station area, to provide a gravity fed transfer system, to stabilize the transfer car from tipping during transfer, to carry off balance loads on the cam rider to stabilize the station car, to provide a station car of standard dimensions suitable for operation on branch lines and sidings, to provide transfer devices which can be added to existing flat cars, to provide transfer devices for the station cars cheap enough that the containers or trailers can be stored for days on the transfer car to wait change of train or for loading or unloading, to provide handling of the containers and trailers from underneath so that they can be of various lengths, heights and widths and such that they do not require strong sides or tops or any sides or tops or so they can be lifted off the transfer devices by a crane above, to provide a gantry with crane that extends out over a station track to load and unload the station cars and put containers in storage without blocking movement of the cars except when extending down in transfer, and to combine these features into one system.

These and other objects, features and advantages should become apparent from study hereof by those skilled in the art or will be pointed out in the description of this invention with reference to the drawings wherein:

FIG. 1 is a perspective of a passenger and freight gravity-fed side-transfer station with train passing for selective unloading and loading of containers and trailers of lengths such as 20 and 40 feet.

FIG. 2 is a plan of a station car coupling a container car in the train passing the station and schematic of release and coupling controls.

FIG. 3 is an enlarged schematic of the inductor and receiver of FIG. 2.

FIGS. 4 and 5 are respectively plan and side sectional views of the station car holding stop and starter.

Figure 6:
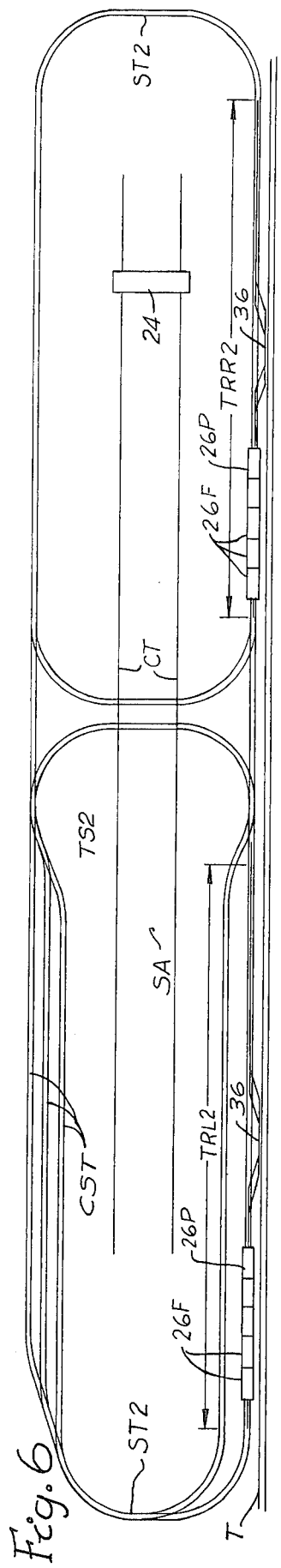
FIG. 6 is a station plan where successive coupling replaces gravity feed.

FIGS. 10, 11, and 12 are some variations of the station plan.

FIG. 13 is a schematic plan of transfer conditions check, coupling and control circuits.

FIG. 14 is a perspective of a side-coupler block with portion cut away to show interior.

FIG. 15 is a plan view of the latch housing in the coupling block.

FIGS. 16 and 17 are sections respectively on lines 16—16 and 17—17 of FIG. 15.

FIGS. 18 and 19 are further reduced plan and side views of the side coupling block engaged by a coupling rod of a cylinder with circuit connections for replacing the photoelectric cells and lights of FIG. 13.

FIG. 20 is a section on line 20—20 of FIG. 18.

FIG. 21 is a plan of a simple bytrack station and car along side a branch line railway for one or more industries served by trains nonstop.

FIG. 22 is a closer plan of a portion of the transfer run at the station of FIG. 21 showing car at station transferring containers to or from train moving by.

FIG. 23 is a side elevation of the cam track from plan FIG. 22.

FIGS. 24, 25, and 26 are views showing respectively end and portion of plan and side of transfer car with transfer arms extended to transfer container to or from moving railway car.

FIG. 27 is a side of roping on transfer device.

FIGS. 28 and 29 are sections of various telescoping guides for the transfer device to larger scale.

FIG. 30 is perspective of cam riders on lift section of cam track.

FIG. 31 is an end view of the transfer car with transfer device extended under container over trailer to transfer container while car and trailer are stationary.

FIG. 32 is a plan view of a station with cam tracks for transfer and pedestal or flat container car or passenger container car in train and at station for transfer of containers in both directions between train and station cars while moving by the transfer run.

FIG. 33 is a plan view of trask with cam rider shifters for extending transfer devices while car shown in phantom is stationary to set off or on a container or trailer at the station.

FIGS. 34 and 35 are side and end views of the rider operator in the station track with portion of rider shown thereon.

FIG. 36 is a plan of cam track lift-off and turn-out (or in) curve.

FIG. 37 is a side elevation of the cam lift-off of FIG. 36.

FIGS. 38, 39, and 40 are respectively end, plan and side views of a variation of the transfer device extended the from railway transfer car to transfer a semitrailer on parallel running coupled railway pedestal car.

FIG. 41 is a plan view of a variation of the transfer car transferring a container from a pedestal car in train moving to right along first transfer run.

FIG. 42 is a side elevation of the transfer car and load of FIG. 41.

FIG. 43 is to larger scale an end elevation of the transfer car and a portion of the pedestal car coupled before transfer and showing extended transfer position in phantom.

FIGS. 44, 45, and 46 are elevation and sectional views taken on respectively lines 44—44, 45—45 and 46—46 of FIG. 43 to show the construction of the transfer arms, support and guides, and actuating devices to a larger scale.

FIG. 47 is a sectional view of a spacer bearing on the transfer actuating device.

FIGS. 48 and 49 are partial sectional elevations on lines 48—48 and 49—49 of FIG. 41 to show the cam rider extended.

FIG. 50 is a sectional view on line 50—50 of FIG. 49.

FIGS. 51 and 52 are respectively side elevation and plan of the cam rider and drive connection to the actuation shaft on the transfer car.

FIGS. 53 and 54 are sectional views on line 53—54 of FIG. 52 in respectively retracted and extended positions to show clutch details and control to larger scale.

FIG. 55 is a side elevation of the actuating gear, clutches, and control corresponding with FIG. 52. FIG. 56 is a plan partially schematic to show a variation of the drive for more than two transfer devices per car.

FIG. 57 is a plan for controlling the transfer devices directly from the pedestal car. FIG. 58 is a plan view of the central portion of a transfer car for transferring from either side.

FIG. 59 is a sectional elevation taken on lines 59—59 of FIG. 58.

FIG. 60 is a side elevation of one end of the car of FIGS. 58—59.

FIG. 61 is an enlarged sectional elevation through the transfer guides taken on line 61—61 of FIG. 59.

FIG. 62 is a partial exploded perspective and schematic of a transfer cylinder and valve sectioned at each variation in porting.

FIG. 63 is diagram of lift or tilt controls for the transfer devices.

FIG. 64 is end elevation of a bottom corner of container on pedestal with transfer arm before lifting and in phantom positions after release and lift-off as labeled.

FIGS. 65 and 66 are side elevation geometric studies of respectively a one and a two rise station track with corresponding two and three rise cam track transfer lifts, car being shown with wheels in positions of change of grade to plot cam track for cam wheel at center of car and showing lift-off of container.

FIG. 67 is perspective of container on hooks over storage pedestals.

FIGS. 68–71 are end views of some variations on the application of the transfer devices.

FIG. 72 is a plan view of a flat car with two of a variation of the transfer devices mounted thereon one extended over a coupled pedestal car.

FIGS. 73 and 74 are side and end views of the transfer car of FIG. 72.

FIG. 75 is an enlarged section on line 75—75 of FIG. 72.

FIGS. 76 and 77 are plan and side elevation of the cam actuator for this car.

FIG. 78 is a combined plan and elevation schematic of successive cam track transfer runs for stations having separate runs for unloading and loading.

FIG. 79 is a side schematic of cam track with cam followers on the lifting or lowering portion of transfer run at left in FIG. 78 to larger scale.

FIGS. 80, 81, and 82 are sections on those respective lines of FIGS. 79, 78, and 79 respectively to larger scale.

FIG. 83 is a schematic perspective of cam track for run at right in FIG. 78 with cam riders and gearing for operating transfer devices including a dump gate.

FIG. 84 is a perspective of a three axle cam rider crossing gap in cam track at railway track rail.

FIG. 85 is end view of passenger transfer car transferring container to or from railway passenger car.

FIG. 86 is a plan view of passenger-type container and transfer cars during transfer on a side cam transfer run.

FIG. 87 is a side elevation to smaller scale of the transfer car of FIG. 86 on the lift of the transfer run.

FIG. 88 is a sectional view to larger scale on line 88—88 of FIG. 86.

FIG. 89 is a side elevation of a portion of the transfer car of FIG. 88 showing a transfer arm and linkage to vertical guide.

FIG. 90 is a broken plan view of the transfer device on the transfer car of FIG. 88.

FIG. 91 is a plan view on larger scale showing the linkage between corner of transfer bed vertical guide for parallelogram brace on the transfer car of FIGS. 86-88.

FIG. 92 is a vertical broken elevation of the cam rack guide and drive.

FIG. 93 is a side elevation of the transfer device on the station car of FIGS. 86-88 and on the cam track.

Figure 95:
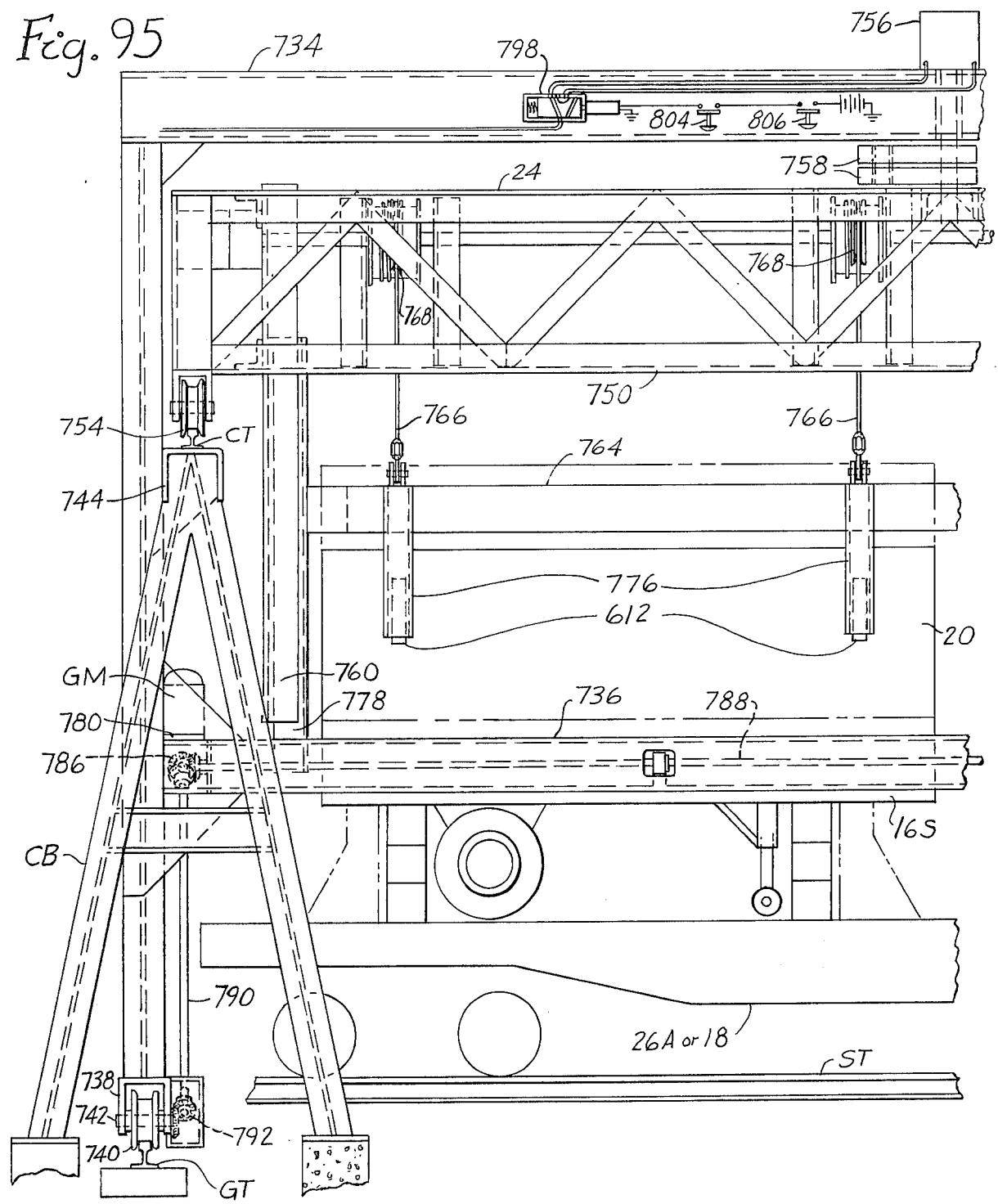

FIGS. 94 and 95 are respectively end and half side elevations of gantry with crane extending onto runway over station track transferring container between railway car and storage spot.

FIG. 96 is partial plan to show crane extension arms and rotary cylinder.

FIG. 97 is plan detail of crane car track connection between gantry and runway over railroad track.

Figure 98:
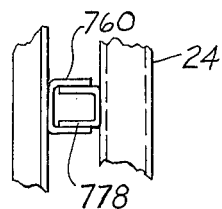

FIG. 98 is a section on line 98—98 of FIG. 95.

Referring to the drawings and in particular to FIG. 1 wherein a passenger and freight container and storage station TS along railroad track T is serving train 12 moving from left to right on track T. Train 12 includes one or more passenger container cars 14 for transfer of passengers in containers 16 to and from the train and/or one or more freight container cars 18 of length for two short containers 20F or one long container 22F (shown as 20' and 40' respectively). The station cars of the system could be longer to carry more or larger containers or of length for only one container each.

Station TS has station track ST comprising two rectangular loops LL and LR, standard railroad track, joined in form of figure eight with a side of each loop run along one side of track T for a transfer run TRL loop on left and TRR for loop on right and track of both loops run at right angles under a crane runway track CT on which runs one or more traveling bridge cranes 24 to serve a container storage area SA and truck delivery and pickup area TA. The crane runways can be elevated the entire length of the crane runs, or preferably the bridge crane is carried by a traveling gantry G which runs on track GT along the ground and has track CT' for bridge crane 24 which aligns track CT on a short craneway over track ST to extend the crane out over track ST, thus saving the gantries from crossing track ST and interferring with the station cars thereon. Additional adjacent gantry runs can be added for larger stations or the span of the gantries increased for station cars of twice the length or to serve more than one car at a time. The gantry and its crane will be described in detail later with FIGS. 91-95.

Station TS has freight container cars 26F and passenger container cars 26P on track ST including classification tracks CST to sort empty station cars according to type or in sequence for trains and store loaded cars sorted to train route, so that empty cars are ready to be moved by locomotive 27 to head end of first transfer run for unloading the train and loaded cars for each train are together ready to be moved to near end of second transfer run for loading the train according to direction of train to wait for transfer of container loads therewith.

Station cars 26F for this station preferably each have two railway swivel trucks 28 supporting a sill frame 29 with or without a flat bed 30 supporting two side transfer devices 32 secured theron each for transferring a container 20F or both operated simultaneously for transferring a container 22F. Each transfer device 32 has a rider 34 which engages a cam track 36 along each transfer run to extend the riders simultaneously from a side of the car and return them to extend and return arms 38 of the transfer devices for transfer of one or two containers to or from the car. The cam track and the station track has a downward incline or inclines 44 as it runs along the outward central portion of each transfer run for the extended arms 38 of the transfer devices to set down or pick up a container according as direction of travel is to or from the station respectively. The high ends of the transfer runs of the station track are at the middle of the station, whereby the first transfer run passed by the train in either direction is for unloading and the second for loading the train.

Container cars 18 and 18' in train 12 have pedestals 46 as in my U.S. Pat. Nos. 3,528,569 and 3,677,194 for supporting and securing containers or trailers at a height for transfer devices 32 on cars 26F to reach under them side load or unload. The containers 20F and 22F and trailers 20S and 22S have latch devices on the bottom which are released by the lifting of arms 38 thereunder and which register with catches on the pedestals to locate and latch as described in these patents. The pedestals are of height to provide room for wheels of trailers with clearance but could be lower if only containers are to be handled.

The station cars need not be self-propelled but, to reduce their cost, are positioned by locomotive 27 on gravity feeds 48 of track ST and gravity fed to and from the transfer runs. At each end of each transfer run the station track curves away from track T and branches into up and down grades. The inner track is low and the outer track is high. A stop-starter 50 is positioned near the bottom of each feed track 48 to each transfer run for holding the line of transfer cars thereon and for releasing and starting them one at a time in coupling proximity to a container car 18 or 18' signaling for that coupling transfer. The empty transfer cars are fed down the outer high tracks of the first loop according to train direction, and transfer cars loaded for the train are fed from the center track down the outer middle high curve of the second loop along the route of the train. Sidings and switches can be provided along track T at each end of the transfer runs (at ends of station) so as one train completes the transfer runs another from either direction can be switched onto track T for transfers.

Each truck 28 supporting cars 26F and 26P has a vertical cylinder 54, FIGS. 2 and 5, whose rod 55 extends down through a hole in the bolster 56 to which the cylinder is secured to engage a stop 50 at the front of the car. Cylinders 54 are equally spaced on opposite sides of center on the two trucks of each car to align with stop 50 only on the front truck, the opposite truck being at front on the opposite feed tracks for train from opposite direction.

The preferred stop-starter 50 for holding and starting cars 26F and 26P as they are about to be coupled to a container car is shown in FIGS. 2, 4 and 5 at the left end of a transfer run and would be the same turned around for the right-hand end. Each stop 50 is a latch block 57 mounted on a carriage 58 which rolls on wheels 59 in channels 60 secured to the ties between rails of track ST. The stop has a cylinder 62 secured to the ties and connected by pin through rod end to carriage 58 to extend the carriage to the right slightly to absorb bump of station cars but extends fully when, as or preferably just before the station car thereat sidecouples a car 18 or 18' or 14. Channels 60 dip at right end to release pin 55 if not retracted when car side couples.

The station cars 26P and 26F for this station each have a side coupler arm 64 pivotally secured at each end of the car and each extended by an air cylinder 65 operated from line 66 connected to AIR supply through solenoid valve 68 spring returned to exhaust. Valve 68 is controlled from the railway car which is to be coupled.

Cars 14 and 18 for train 12 have an unload relay U and a limit switch 70 for each berth for container. One or more relays U are lifted to reverse the car for unloading similarly as in my U.S. Pat. No. 3,483,829. A relay U is lifted for each berth on a car with container for that station to have the next empty car 26 on the near stop 50 couple with that car. A relay LU is lifted on a car having all berths empty for loading from a station car on the near stop 50 of the far loop transfer run. The circuits whereby relays U and limit switches 70 signal are from positive of battery 72, front contacts of relays U for each berth in parallel to line 74, normally closed contacts of limit switch 76, coil of relay LU to ground of battery 72, and from positive of battery 72, in series, normally closed contacts of limit switches 70 each closed when its berth is empty, line 78, normally open contacts of switch 76 closed by ramps 80 at start of loading transfer runs, coil of relay LU to ground. Relay LU connects the positive of battery 72 through its front contacts to line 82 to an electromagnet inductor coil 84 at whichever end is at front of car through a directional switch 86. Switch 86 is as shown in my U.S. Pat. No. 3,038,066, FIGS. 8 and 9.

The front energized inductor 84 of car 18 shown in FIG. 2 has just passed trackway receiver 88 which has closed its inductive vane switch 90, FIG. 3, by magnetism of the inductor moving the soft iron vane 90 to the right, closing contacts which complete a circuit from the positive of battery 94, switch 90, solenoid of dashpot timer 96, solenoid of valve 98 in series to ground of battery 94. Timer 96 opens this circuit after time for forward pin 55 to pass stop 50.

Valve 98 connects AIR to the head end of vertical cylinder 100, FIG. 2. Cylinder 100 is secured to ties of track ST under car 26 at stop 50 to close limit switch 101 on that car, connecting the top coil of relay 102 across battery 104, closing a holding circuit for relay 102 from positive of battery 104, normally closed contacts of reset limit switch 106 opened by track ramp 108 just ahead of each holding stop 50, front contacts of relay 102 and bottom coil of relay 102 in parallel with solenoid of valve 68 to ground of battery 104, connected AIR to line 66 to rod end of cylinders 54 for pulling stop pin 55 and to head ends of cylinders 110 for pulling end coupling pins and to brake cylinders 112 for releasing brakes, and to cylinders 65 for extending side coupling arms 64, whereby the station car is ready a few feet ahead of alignment to couple the faster moving railway car which signaled and is moving preferably about five miles per hour or less. The pulling of the rear coupling pin can be delayed by restriction 114 in line thereto, so starter 50 is used to start the whole line of station cars moving down the incline before uncoupling so the second car in line will follow closely the first.

When cylinder 100 has extended it opens a connection to pilot valve 115 to force it against spring pressure to reverse connection of AIR from rod end, to head end exhausting the opposite end forcing stop 50 forward with pin 55 to start the line of station cars in motion. Stop 50 drops down from pin 55 at end of travel where it remains until timer 96 opens circuit of solenoid of valve 98. Pilot valve 115 is connected to side port on cylinder 100 near rod end and is reset by its spring in rod end when cylinder 100 exhausts through valve 98 when deenergized after delay set by bleed-check valve 119 on dashpot 96 so switch 90 is open and cylinder 100 back down before the next car in line reaches stop 50. Cars 26 in line can couple successive cars in train.

The controls could be simplified by putting the coupling arms 64 on the railway cars in train but these cars preferably should not have protrusion from sides which might be swung out at wrong time.

Coupling arms 64 latch with a coupling block 120 on each end of the container cars in the train. These blocks are as shown in my U.S. Pat. No. 3,483,829, especially as in FIGS. 55 and 56 thereof to have cushioning travel, or as shown improved herein, FIGS. 14–20.

SUCCESSIVE COUPLING-UNCOUPLING

As an alternative to moving the station cars by gravity or other means to the starting stop 50 the couplings on successive cars can be extended to couple the station cars from where they are lined up. A station plan for this, FIG. 6, need not have full loops but has feed tracks run along adjacent in track T. The side coupling can be controlled as in my U.S. Pat. No. 3,483,829, FIG. 51, here modified in FIG. 7 for each transfer run of station TS2, FIG. 6. Station TS2 has its track ST2 in form of two rectangular loops each with adjacent side run parallel under crane run CT and each including a transfer run TRL2 and TRR2 along a side of track T. Storage area SA and classification tracks CST are provided. Station cars can be as in FIG. 2 but use only forward side coupler controlled preferably as in FIGS. 7 and 8. At each end of each transfer run, FIG. 6, station cars 26P and/or 26F are lined up on the left for trains from the left or on the right for trains from the right, empty station cars at first run and those loaded for that train on the second run to be passed by the train.

Figure 7:
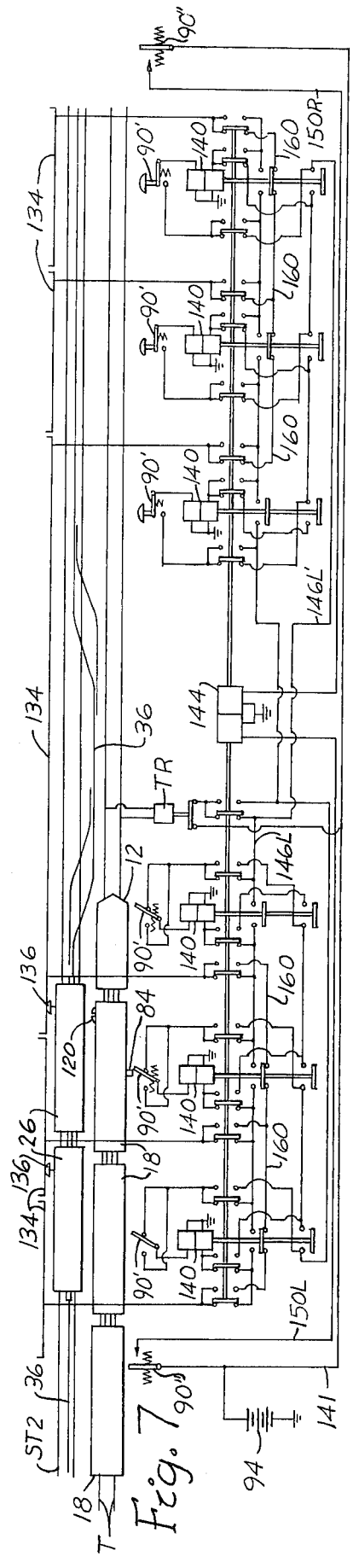
FIG. 7 is a schematic of coupling controls for each transfer run at the station FIG. 6.
Figure 8:
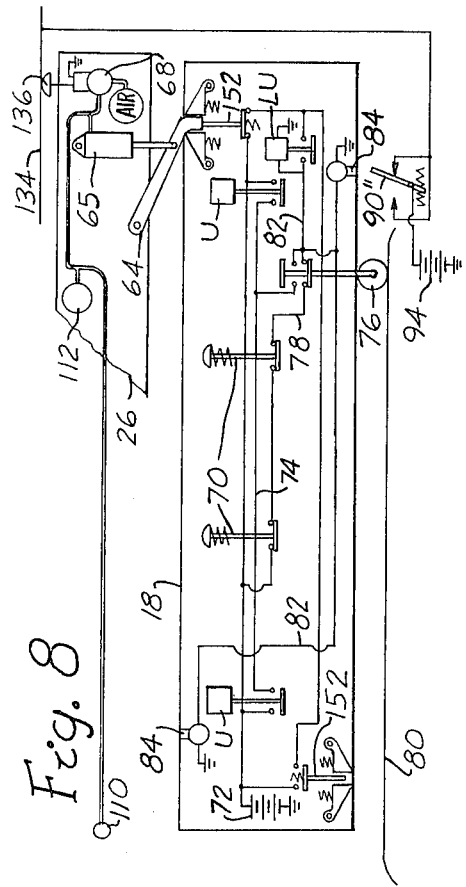
FIG. 8 is a schematic plan of transfer controls on car in train coupled with a car of station FIG. 6.

Referring to FIGS. 7 and 8 for the preferred successive coupling and uncoupling control circuits, a contact rail 134 is provided along each transfer run of the station track and car length segments of rail 134 insulated apart for each waiting position at the ends of the transfer run. Each station car 26 has a shoe 136 engaging rail 134 which spans adjacent segments in crossing. Each car 18 has an inductor 84 extending down oppositely off center on each truck as in FIG. 2 or one central of car as in FIG. 8. Each line-up stop 50 or starting point has an inductive receiver switch 90'. These are circulated to sequence coupling, starting from the car 26 at head of line, i.e. opposite end of line from which train approaches and to sequence uncoupling in the same order, each successive uncoupling being one car length displaced in the direction opposite to train movement. Switches 90' are trackway mounted one at each spot for extending coupling, which is less than car length ahead of each latch block 120 to be engaged. Switches 90' connect power to segments of rail 134 in succession to extend couplings of station cars from farthest, i.e. last met by the first car reserved for that transfer, loading or unloading on respectively the first and second transfer run as encountered by the train.

Each sensing device 90' controls a stick relay 140 with closing coil above holding coil. The circuits for the closing coils of relays 140 of the successive coupling spots at left, FIG. 7 are from the positive of battery 94, line 141, back contacts of track circuit relay TR dropped while train passes station, left contacts of train direction relay 144, line 146L through front contacts of each relay 140 in the lineal succession to the left, left contacts of directional relay 144 next ahead of each relay 140, sensing switch 90' for and closing coil of that relay 140 in series to ground of battery 94. The circuit for each holding coil is from line 146L, left through front contacts of that relay 140, left directional contacts of relay 144 for and bottom coil of the relay 140 for that segment in series to ground. Each successive segment of rail 134 starting with the contact rail 134 along the transfer run is connected through the left contacts of relay 144 to line 146L to left of front contacts of the relay 140 for that segment. Directional flip-flop relay 144 is thrown to left or right by respectively a train from the left or right. This is done by the first energized inductor 84 on the train passing a leading inductive switch 90", at far left and right, which then connects battery 94 to line 150L or 150R to left or right coil of relay 144 by train from left or right to position relay 144 to left or right respectively.

With respect to center of station the outer line-up spots are for unloading; the inner ones for loading. Limit switches 76 on each pedestal car 18, FIG. 8, are engaged by a ramp 80 along each loading line-up and close a circuit for lifting relay LU. The unloading signal for inductor 84 is through normally closed contacts of limit switch 76 and the loading signal through normally open contacts of the switch 76 closed along the loading line-up spots only; but once the inductor is energized, relay LU holds it energized by circuit from positive of battery 72, normally open contacts of coupling switch 152 closed when the car is side coupled to a car 26, front contacts and coil of relay LU to ground in parallel with coils of inductors 84 to ground. Thus inductors 84 signal for both coupling and uncoupling, since they remain energized after the side coupling until the car is uncoupled.

POSITIONALLY SUCCESSIVE SIDE COUPLING OPERATION

The first car having an inductor 84 energized passes the receiver switches 90' without completing a circuit until the farthest (first) relay 140 is energized, then the next car with inductor energized lifts the next (second) relay 140 etc. each successive relay 140 connecting battery 94 to a successive section of rail 134 to extend side coupling from station cars within a car length ahead of alignment for coupling in sequence the cars in train which are reserved for unloading.

The uncoupling control circuits for each station car, FIG. 7, from train from left are from positive of battery 94, line 141, back contacts of track circuit relay TR, left contacts of directional relay 144, line 146L' through lower front contacts of relays 140 from the farthest back, and from line 146L' in parallel before each relay 140, left contacts of relay 144, switch 90' and top coil of its relay 140 in series to ground to close relays 140 in order from farthest first, one for each side coupling car. Relays 140 are each held by connection from line 146L to left of that relay 140, lower coil of the relay 140 to ground. Relays 140 connect all segments at far end of the run together to rail 134 when direction relay 144 is thrown and disconnect power to these segments of rail 134 in sequence to uncouple from farthest segment of rail 134, left contacts of relay 144 to line 160 to the next section of rail 134 beyond that for the relay 140. Line 160 beyond the contacts of the farthest relay 140 to right (or left) is connected to a section of rail 134 for unsidecoupling the first side-coupled car only. After the train passes track circuit of relay 144, this relay is energized, disconnecting power to all relays 140 of the transfer run or runs along track T by the station for the coupling-uncoupling control to be reset for the next train form either direction.

Train car 18, FIG. 8, has circuits for signaling for both coupling and uncoupling for operation with circuits of FIG. 7 to control successive station cars to couple and uncouple from a transfer run each after the first successively a car length displaced in direction opposite to the train's direction for either direction of the train. These circuits can be as in FIG. 2 except coupling switch 152 is added and relay LU held closed through the coupling switch to signal for uncoupling from inductor 84'. Relays L are provided as in FIG. 2 if partly loaded cars in train are to be completely loaded therefore requiring prearranged loading of station cars for containers to align empty spots on cars partly loaded in train and/or if any cars are loaded with containers for selective unloading to different stations. These features can be provided for containers 16 and 20 as per my U.S. Pat. No. 3,483,829, FIGS. 25-38 or for mix of containers 20F and 22F for cars 26F with controls as per my patent no. 3,956,994, FIGS. 37-41, but the saving over leaving empty space on some cars 26F may not be worth those extra controls to fill these half loaded cars, but if not done the station car must be loaded with containers only for one station unloading. Short containers 20 can be grouped for shipment together in pairs by attendant at originating station.

If only empty cars are loaded by this station and all cars for loading completely unloaded, both transfer devices can be operated whenever station car is coupled to railway car eliminating need for relays L. FIG. 8 shows controls for this simplified transfer, since the earlier disclosures and FIG. 2 cover controls for more complete loading.

Referring to FIG. 8, for unloading, a circuit is completed from positive of battery 72, front contacts of relay U for each berth in parallel to line 74, normally closed contacts of limit switch 76, coil of relay LU to ground of battery 72. Inductor 84 is connected in a circuit from positive of battery 72, side coupling switches 152 closed when coupled on right or left side of car and connected in parallel, front contacts of relay LU in parallel with coils of inductors 84 and of relay LU to ground holding relay LU closed after coupling to keep inductor 84 energized after cam switch 76 lifts along empty first loading line up track until the car is uncoupled so the inductor can signal at the end of the transfer run for successive uncoupling.

A load signal ramp rail 80 for cam switch 76 is trackway mounted along each of the middle line-ups for connecting inductor 84 if limit switches 70 are closed calling for loading the railway car. Cam switch 76, when lifted along rail 80, closes a circuit from positive of battery 72, normally closed contacts of limit switches 70 in series (one for each berth) closed when that berth is empty, normally open contacts of cam switch 76, coil of relay LU in parallel with inductor 84 to ground. Side coupling switch 152 at front is closed when the cars couple to hold relay LU lifted after cam switch passes off rail 80 to keep inductor 84 energized to signal for uncoupling at far end of the loading transfer run.

The shoe 136 of each station car 26, FIG. 8, engaging a live rail 134 completes a circuit through solenoid of valve 68 connecting pressure to head end of cylinder 65 which extends coupling 64 out to engage coupling block 120 on left side at front of car 26.

VARIATION FOR SUCCESSIVE POSITION SIDE COUPLING

Figure 9:
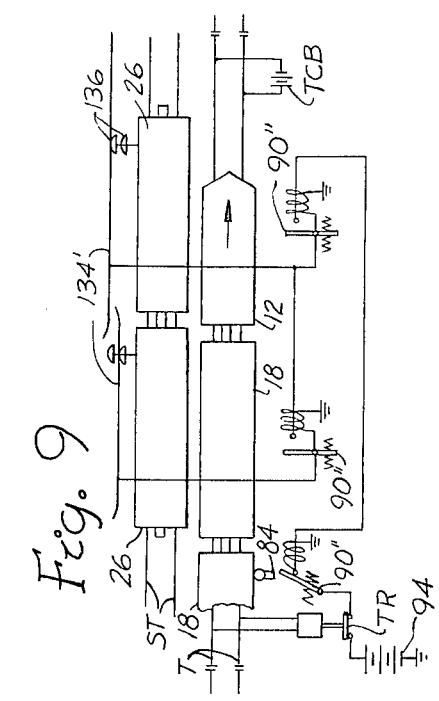
FIG. 9 is a schematic of a variation of the coupling controls.

Since the station cars will roll after uncoupling and have speeds safe for bumping each other, up to several station cars can be uncoupled at the same spot after each transfer run. FIG. 7 is therefore simplified as in FIG. 9 where contact conductor 134' is run and insulated into segments of car length at each end of each transfer run as in FIG. 7, for shoes 136 on the waiting cars to engage to extend coupling when the segment on which they are standing is energized. The central transfer segment thereof extends along the transfer run to keep the coupler extended to end of the transfer. Track T has a track circuit extending along the transfer and waiting sections with battery TCB feeding relay TR. A receiver, stick vane relay 90", is positioned adjacent each segment where coupling is to be extended within car length ahead of an approaching car 14 or 18 in train and another relay switch 90" ahead of each line up for each direction as is 90 FIG. 7. Switches 90' are located and have a spring centered vane to be thrown by an energized inductor 84 in direction of train. Switches 90" are arranged to close only on the first line-up for each transfer run met by the train from either direction, ie. FIG. 9 shows a two car starter; the one at the opposite end of the transfer run would be the mirror image of this. Additional starting sections can be added.

The switch 90" at left, the first thrown by train 12, closes contacts in direction of train, closing a holding circuit from positive of battery 94, normally closed contacts of track circuit relay TR, vane to contact to coil of switch 90" at left to ground, and from the contact of the switch 90", line to contact of far switch 90", which is not thrown until the first energized inductor in the train passes over that switch, which moves its vane to connect to coil of that switch to ground and in parallel with the coil to transfer section of conductor 134 and to contact or next vane switch 90" to the left, etc. The coils of switches 90" are on a magnetically soft core to release the vanes when relay TR is energized and opens the chain of circuits after the train passes the station. Uncoupling occures when shoe 136 runs off far end of center section of rail 134. Car retarders can be used to slow successive cars increasingly and according to their weight.

SOME FURTHER VARIATIONS OF STATIONS

Since the loops of the station tracks take considerable space, other station plans may better fit and site and operating conditions. The station cars 26 at these stations can be moved, fed or propelled to coupling feed or waiting point against a stop 50 or on one or more coupling segments 134 as described and wait for their train.

Station, FIG. 10, has track ST parallel track T for two successive transfer runs TRL and TRR spaced apart and connected along a runby siding for storing the cars with outgoing and received containers separately. Outer ends of the station track are for empty station cars. The station track is about six inches higher from center out to about middle of each transfer run and slopes down as does the cam track 36 for that change of elevation before the cam track returns in. A crane C on track CT runs at right angles across the branches of track ST and covers truck drive and storage spots SA. This layout is suited where the land extends back from the railroad, since the crane can run back from the railroad any practical depth for storage and the station track run along the right-of-way.

Station, FIG. 11, follows the right-of-way with gantry or bridge crane C', truck drive TA, and storage area SA run parallel the railway. Each transfer run has an optional runby track STr for spotting or returning empty station cars at ends of the station to position under the crane without interferring with operation of the transfer runs TRL and TRR at left and right ends of the station.

Station, FIG. 12, utilizes the station cars to set the containers off on storage spots along side the station track ST or transfer them to trucks or trailers. The station has a transfer run at each end of the station except at a terminal station where all containers are unloaded and an empty train reloaded when reversed or turned around. The station track ST has a passenger siding STP to passenger station PS, a Y for turning station cars around to load or unload on either side of the tracks STS in storage area SA.

All the stations can serve factory sidings, spur and branch lines with station cars. The containers and trailers can be left on the station cars for these movements and for storage while loading and unloading, since the additional cost of the flat cars equipted with transfer devices should not be much.

SAFETY CHECKS BEFORE TRANSFER (OPTIONAL)

After a station car is side coupled to a moving railway car the unloading and/or loading requirements of the railway car are retransmitted to the station car and checked with its loading to limit transfer to safe conditions. Lights can be used to signal between parallel running cars as taught in my U.S. Pat. No. 3,484,002, FIG. 49, to check loading before transfer is permitted.

Referring to FIG. 13, car 18 has lamps along each side, a lamp 180 for each berth to signal unloading, a lamp 180' to signal unloading a load covering both berths, and a lamp 182 for signaling for loading for each berth. These lamps respectively align photoelectric cells 184, 184', and 186 on a coupled car 26. Lamps 180 are lit by circuits from positive of battery 72, coupling switch 152 closed by coupler 64 to line 188 for that side of car 18, from line 188 for each side in parallel, front contacts of each relay U, each to a line 190, normally closed contacts of long load switch 70' located between berths to be opened by load spanning the berths, lamp 180 for that berth, to ground of battery 72 and from each line 190, normally open contacts of load switch 70' closed by a long load, both to lamp 180' to ground. Lamps 182 are each lit by a circuit from line 188 for that side of car 18 to normally closed load switch 70 of each berth opened by a load in the berth to lamp 182 of that berth to ground.

The output of cells 184, 184', and 186 are each connected through an amplifier to energize relays U', U", or L' respectively for that berth. An unload check and control circuit is completed from positive of battery 104, coupling switch 192 closed when coupled, line 194, in series front contacts of relay U' and bottom normally closed contacts of load switch 196 closed when that berth is empty, transfer controller 198 for that berth to ground, which circuit connects the transfer device for that berth to operate along the transfer run, and from line 194, line 200, normally closed contacts of each load switch 196 in series covering the berths for a long load, front contacts of relay U" for that series of berths to transfer controls 202 for connecting both transfer devices to work in unison. A loading check and control circuit is completed from line 194 in series for each berth, front contacts of relay L' and normally open contacts of load swich 196 to transfer controller 198 for that berth to ground, and from line 194, lower front contacts of relays L' and normally open contacts of load switch 196' in series (or switches for transferring a load spanning a plurality of berths on car 18) to controller 202 to ground to connect a group of transfer devices for loading in unison a long load onto car 18 so checked to be empty therealong.

Electrical coupling can replace or suplement lamps and photoelectric cells of FIG. 13 by separate electrical couplers or preferably electrical coupling between the side coupler and latch box connecting lines a, b, c, d, and e on car 18 each to line of same letter on car 26 each to a relay controlled by the lamp bypassed.

SIDE COUPLING

The side couplers and latches, FIGS. 14–20 are relatively tight locking to include electrical connections.

The extensible side coupler 64', FIG. 18, for interfitting in latch block 120, FIGS. 14–20, suitable for electrical coupling, has a round head 208 (or diamond shaped end) to align and fit closely in the latch block. Head 208 is mounted in a parallelogram linkage with two parallel arms 210 pivotally secured to the head at one end and to car 26 at opposite end to maintain head 208 in transverse alignment for tight coupling while extended and retracted from side of car 26 by air cylinder 65 pivotally connected between an arm 210 and frame of the car.

The latch block 120 for this coupler has an inner box frame 212 mounted by keying 214 to slide along an outer box frame 216. The inner frame is centered by heavy springs between the ends of the inner and outer frames. Two facing latches 218 each swing out to position shown FIGS. 14, 15, and 18 and in flush on pins 220 between sides of the inner frame. Latch frame 120 closely holds head 208 between concave cylindrical faces 222 (or wedge for diamond) on face blocks 224 which slide in substantially parallel grooves 226 in inner faces of inner frame 212. The facing ends of each latch 218 seats on a web 228 in a face block. The face block extends out as far as the latch and has legs 230 which extend out the back straddling the latch to keep the face block from turning. Each face block is forced outward by a spring 232 between the back of web 228 and a back strap or extension 234 on inner frame 212. Latches 218 have a flat 236 at pivot end which engages the inner frame to limit outward movement of the latch and face block. Either face block recesses when the latch bearing thereon is forced in for coupling and rebounds to couple the head 208 closely. The face blocks preferably have a slight taper in to wedge tight on the coupling head.

This tight fitting coupling enables electrical coupling if desired to be carried therethrough. An enclosed contact (a feature disclosed in my U.S. Pat. No. 3,037,462) self-engaging electrical coupling 240 is secured to inner frame 212 on strap 234 straddled by sides of face plates 224. Coupling 240 has a contact piston 242 which slides outward from an outer cylinder 244 into a mating insulated sleeve 246 secured in end of head 208, FIG. 20, to connect electrical contacts a, b, c, etc. on the inner wall of the sleeve with contacts on the outer wall of piston 242 connected by wires in flexible cable. Sleeve 246 has a recessable cap 248 forced out flush against stop by spring 250 to let piston enter. Coupling 240 has an outer and inner walled oil reseroir cylinder 252 closed at the back and connected by tube to head of piston cylinder 254 secured in cylinder 252 with rod central extending and connected to move piston 240 in and out. Cylinder 252 is filled with oil between inner and outer walls and has an oil tight ring piston cap 256 held outward against a lip around the outer wall of cylinder 252 by coil spring 258 in the oil. Coupler head 208 fits into outer wall of cylinder 252, pressing cap 256 in to force oil into head end of small cylinder 254, which extends piston 240 into head 208 where electrical contacts are made. The difference in sectional area of the reservoir and of cylinder 254 causes the piston to extend several inches while the ring cap is pressed in a fraction of an inch. The cylinder withdraws the piston by spring 258, oil, and spring in cylinder 254 when uncoupling. Piston 242 is keyed to slide in cylinder 252 in insulating sleeve therein and rotate a few degrees so it can key with contacts in head 208.

WAYSIDE TRANSFER TRACK

Referring to FIG. 21 where the preferred transfer cam track 36 is shown applied to a short station track ST along railway track T. This wayside track needs no switch for serving industry, warehouse, loading dock or truck area IN. The transfer run TR is the same as for the larger stations, FIGS. 1, 10, 11, and 12; and details to be described are applicable to all these stations.

Track ST runs parallel a straight section of track T for the transfer run and has a cam track of three rails 260, 260L and 260R for operating transfer devices 32 on the cars on track ST. Cam rail 260 runs full length of transfer run, the full length of the station track FIG. 21, and in plan runs parallel rails of track St except where it curves out from between these rails across rail nearest track T with groove on each side of the cam rail and follows along side of track T about three feet from its rail, gradually slopes up about six inches at 44 and curves back across near rail of track ST also sloped up to meet this elevation and curves back in parallel with track ST to initial spacing between the rails to end thereof. Rail 260R starts at a cam rider wheel flange space to right of rail 260 (as viewed from left) cam rider center distance before rail 260 starts the curve out. Rail 260R starts at or below elevation of rail 260 and is inclined up to lift off three-groooved cam rider wheels to it so they clear over top of rail 260 to turn out. Rail 260R has same curve as rail 260 displaced cam rider centers distance behind rail 260, crosses rail of track ST at same level and curves out along right side of rail 260 at slightly higher elevation so flanges on cam rider wheels will clear to be set over rail 260. Preferably cam rail 260R has a lift 44" cam rider center distance behind and same as 44 but to lift only the rear cam rider. Rail 260R therefore extends on beyond lift 44 at the six inch higher elevation than 260 before sloping below level of rail 260. Rail 260L preferably starts just before 44" along left side of rail 260 a cam wheel flange distance away (about one inch or more) and at or below elevation of rail 260R to help support the cam riders with three grooved wheels, and beyond rail 260R rail 260L rises to lift the triple cam wheels off rail 260 and onto rail 260L which follows the same curves as rail 260 a cam rider center distance behind. Cam rails 260L and 260R engage in respectively left and right side grooves of three-grooved cam wheels and carry the cam wheels across rail of track ST through four grooves for the four flanges of these wheels. The second lift 44" enables simultaneous lifting of both transfer devices, optional.

The three-grooved rider is at left end of car 26 when viewed from transfer side, FIGS. 21 and 22. If cam rails 260L and 260R are placed cam rider centers after the curves in rail 260 from left out and back (instead of before as in FIG. 21) the three-grooved rider would be at right-hand end of the car, the mirror image of FIG. 21, as in FIG. 32 with rise 44" omitted.

Station car 26 has two transfer devices 32, one operated by cam rider 34 and one operated by cam rider 34RL. Each cam rider is preferably a two-wheel inline truck for riding cam track 36 to extend, lift and return transfer arms 38 of both transfer devices simultaneously. Wheels of rider 34 are single grooved wheels 261. Wheels of rider 34LR are three-grooved wheels 263. The single groove of wheels 261 and center groove of wheels 263 ride rail 260. Rails 260L and 260R engage in respectively the left and right-hand grooves of the three-grooved wheels 263 to switch these wheels respectively to the left and right from rail 260 but do not switch the single grooved wheels. The three grooved wheels can be made of two double flanged wheels with a flangeless wheel between, all the same diameter.

The station car 26 can be made from an old freight car cut down to bed 30 or sill 29 supported on a railway truck 28 or wheels 268 at each end or made new. To this car is added two transfer devices 32 with telescoping arms 38 to extend from side under load and lift to shift to car 26 or extend lifted with load over a receiver therefore and lower to set the load down and return empty. Arms 38 are connected in pairs to transfer the short containers 18 or 20 and two of these pairs operated simultaneously to transfer a long container 22 to or from the car and a receiver. The car 26 is shown with a side coupling cylinder 65' mounted transversely through the sill at center of the car to extend rod 64" out through a strong sleave 270 to couple latch block 120 at middle of car 18, simplifying the coupling for low speeds. Car 18 has recesses 272 in the bed and frame for riders 34 and 34 LR to come in closer than otherwise possible.

Referring to FIGS. 24–26 and 28, transfer devices 32 each have two arms 38 formed formed into a U-fork of U-shaped formed into a U-fork rectangular tubing 276 formed into a U-fork with a channel 278 faced legs out along outer side faces one on each arm 38 of the fork. An intermediate roller guide 280 of larger U-shape has two rectangular tubes 282 for sides connected at one end by angle 284 one leg up and one out under arms 38. Tubes 282 are connected about ⅓ of length to transfer side by rectangular tube 286 curved up at ends secured to bottom of tubes 282 so arms 38 will clear thereover. Guide 280 has a row of flanged rollers 288 with groove 289 around periphery of the flange mounted on inward facing sides of each tube 282 and fitting to roll in channels 278 to support arms 38 for in and out movement, and rollers 290 mounted along outward facing sides of each tube 282 to roll along a channel 292 each side of the guide 280. Tubes 282 and channels 292 extend across width of car 26. Channels 292 are supported on aligned hinge brackets 294 secured to frame of car 26 along one side and supported on rubber blocks 296 extending from spring pockets above other side of the car to support the load even when extended on arms 38. A flexible endless wire rope 298 is run in groove 289 around the roller 288 on each side and anchored at 300 to channel 292 and at 302 to arm 38 thereat to extend and retract arms 38 twice as far and fast as intermediate guide 280 whenever the guide is moved out and in. Arms 38 have conical locators 304 spaced to engage in holes or pockets 305 in bottom of the containers to keep them from slipping off.

A cam rider 34 or 34LR is secured depending at center of tube 286 to support and extend arms 38 to ride on cam track 36 from a position against sill 29 outward across a rail of track ST to an extended position in a recess 272 in car 18 on track T to support the container on ends of arms 38 as rider travels cam track 36 extending arms 38 out and in twice the travel of guide 280 traveling track 36.

The lifting of the cam riders 34 and 34LR on slopes 44 and 44" respectively along the cam and station tracks relative to track T lifts arms 38 simultaneously even more as the transfer devices lift at hinge 294 swinging arms 38 up therefrom. The lifting of car 26 along track ST is after this liftoff and brings arms 38 horizontal. The cam track lifts 44 and 44" are spaced cam-rider center-distance apart so both lifts will lift together for handling long containers 22.

The telescoping guides 280 and arms 38 can be more compact and protected from the weather if constructed as shown in section, FIG. 29, where arms 38' have an additional channel 308 turned legs down along top with one leg extended out beyond legs of channel 278. An extended Z member 310 extends up from along each channel 292 and out over guide 280 and under and up behind outer leg of channel 308 as a rain and dirt stop to which rope 298 is secured at transfer side of car. The arms of the guide 280' are each a channel 312 which fits over channel 292 supported on zees 310 to compact the telescoping section.

For empty car 26 moving to right the cam track operates the transfer devices to extend simultaneously to reach under container 22F on car 18 coupled thereto and then lifts arms 38 as the riders ride up inclines 44 and 44" to lift container clear of car 18 before riders carry the arms back into car 26 while lifted to clear car 18. The cam track operates the transfer devices simultaneously for loaded car 26 moving to left to transfer container 22F on arms 38 out over car 18 and lower to set the container on latch-down pedestals 46 on car 18 and retract therefromunder along the lower level of the transfer run. Thus car 26 when waiting for a transfer run at left end of track ST, FIG. 21, should be empty, and when waiting at right end for transfer should always have one or more containers for train. This is ideal where containers were brought in by train from left and removed when ready by train from right, a typical branch line operation.

RETRACTABLE CAM RIDER

Cam riders 34 and 34LR have one or more cam wheels respectively 261 and 263 in line mounted on end of column 316 and if more than one wheel is used for better tracking they are preferably mounted between sides plates 318 on axle pins 319. This truck is pivotally secured on transverse pin 320 to vertical tube or shaft 316 extending up into tube 324 secured extending into cross member 286 at top. Plates 318 are resiliently held at right angles to column 316 by springs 325 pocketed at each end between them and tab from column 316. Shaft 316 is supported in tube 324 by cam pin 326 through cam slot of shape of sloping integral sign ∫ in a lift plate 328 along each side of tube 324. The plates 328 are connected under sill 29 at each end by a bar 330, FIG. 30, to form a rectangular box around tube 324 and supported on slide bars or rollers 332 secured to tube 324 one or more under each side plate 328. Tube 324 has a vertical slot 334 transversely through center through which pin 326 through shaft 316 slides up and down. Pin 326 is blocked from lifting by resting in the bottom pocket arc of slot ∫ of larger diameter than pin 326 so rider can support the load and yet turn with the cam track and will be self aligning parallel the car to reengage on the cam track. If plates 328 are shifted to left, pin 326 follows up the incline of the cam slot, lifting the rider off the cam track and supporting it from pin 326 when engaged in the pocket at top of slot ∫. A double-acting air cylinder 338 at each end of travel of plates 328 is secured to side of sill 29 with rod ends facing bars 330 to shift plates 328. Cylinders 338 are reversely connected through valve 198' between AIR and exhaust to extend cylinder on left to lower the cam rider or extend cylinder of right to lift the cam rider. Valve 198' can be operated by teeter-toter lever 342 transversely mounted on bottom of the car engaging two trackway cams at each end of cam track 36 beyond which the rider must be lifted, the one closest to cam track being positioned for lowering the rider and the one farther away for lifting the cam rider, or a valve 198' for each transfer device can be solenoid operated by and in circuit as the transfer controller 198 for that transfer device where there is sufficient time after side coupling to lower the riders before outswing of the cam track is reached.

This feature, to lift the cam riders, can be omitted where the cam rider would always be on a cam track, or never cross a grade crossing or switch without a cam track or deflecting plate. This feature enables the transfer car to operate in railway trains, permits the station cars to make branch line runs or run over extensive sidings and is needed if car is used in train to transfer loads to or from pedestal or flat cars when passing stations and for some transfers while stationary.

As an optional additional feature further means enable the transfer devices to operate while their vehicle is stationary. The cam rider is lifted, FIG. 31, for the transfer of container 20 to or from trailer PT on a center curbed driveway TD to bring trailer bed to correct height. A telescoping cylinder 348 is secured clevis mounted transversely in depression in bed 30 between far side of car and a yoke 350 secured to cross member 286 straddling all positions of plate 328 on sill side of 286, to extend the rider out and in. A hydraulic cylinder 352 mounted rod up through hole in bed under lifting end of each channel 292 is connected by hydraulic pressure source through valve to lift arms 38 a few inches to pick up a container above bed of truck or trailer PT or other stationary support. Cylinders 348 are double acting and both per car connected in parallel each through a similar tandem positive-displacement pump through valving to operate simultaneously in a usual manner for such requirement.

One or more wheels 354 secured facing out from bracket 356 under bed of car 26 engage a hold-down rail 358 run along where arms 38 can be extended especially where extended with riders up to keep the car from tipping. Rail 358 is secured to posts 360 embed in heavy concrete footing.

If the transfer cars are used in trains, the cam track 36 can be run along track T and extended for the transfer toward the station track. Along a railway track with interchange at each end it will be advantageous to use transfer cars 26 and container cars 18 both in the trains and at the stations to serve a waytrack having a single transfer run for transfer both ways in each direction of traffic. For this way station both the station track and railway track have a crossing cam track 36 as shown in FIG. 32 for a transfer run serving industry IN for receiving and returning containers in either direction of trains. The cam tracks are both elevated at the same end, the right (or left) half, since they cross but ends of one can extend out beyond the other and have the elevations changed back beyond this grade crossing. If the containers are brought to this station on pedestal car 18 in one direction to be lifted off by station car 26 they are brought to the station on transfer cars 26 from the other direction to be set on pedestal car 18 at the station. This waytrack having both pedestal car 18 and station car 26 has a siding STS to shift either car first to use either or both cars to transfer in either order as train requires. Each container received at the station can be returned back in direction from which it came without shifting to the other car on the waytrack.

The station can have two cam track shifters 362, FIGS. 33–35, spaced for extending both cam riders of car 26 spotted thereon for transfer of containers or trailers between standing cars or trucks or storage spots. Each shifter 362 has a section of cam rail 260' and track rail 364 mounted transversely on top of four parallel channels 366, two along each side separated web from web for flanged wheels 368 secured therebetween to roll on a channel 370 under each side. Channels 370 are hinged in line on brackets 372 secured to floor of pit 374 under track and connected by channel 376 turned legs down across opposite end and lifted by roller on upstanding rod end of cylinder 378 supported in pit 374. Each shifter has a double acting hydraulic cylinder 389 trunion mounted above an angle 382 connected between channels 370 at hinges 372. Cylinders 380 on each of the two shifters are connected to parallel each through a similar tandem positive-displacement pump through valving to operate simultaneously in a usual manner to extend and retract the cam rail 260' to extend and retract arms of the two transfer devices together to transfer load spanning both. Head ends of cylinders 378 on the two shifters are connected to pressure source through valve to lift cam track sections 260' together to transfer the long load. Car 26 can be spotted over just one of the shifters for transferring short container or one shifter valved off for this.

Referring to FIGS. 36 and 37, the cam track lift-off rails are shown in detail with at hump in rail 260L to lift three-grooved wheels off and over rail 260 when traveling left to right or over and onto rail 260 when traveling right to left. The grooving of the railway rail to let the four flanges of the cam wheels 263 cross at grade are shown at CX. The cam track could cross rail of track ST at a higher elevation past a gap thereat by having three cam wheels 261 or 263 in line on the cam tracks, FIG. 84.

A variation of the transfer device is shown in FIGS. 38–40, where the arms of the intermediate guide are deep channels 282D turned legs in and having the two rows of rollers, 288 above and 290 below, along flat outer sides of the channels. Fork 38 is of square tubing 276' in U-shape with a channel 278 run legs in along bottom of each arm engaging rollers 288 therein. The lower rows of rollers 290 run in channels 292 as described with FIGS. 24–26. Cross member tube 286 is braced on top by channel 386 to angle 284 at center. The transfer device is higher than in FIGS. 22–28 to engage bottom of semitrailer PT for transfer to and from the train etc. The construction is otherwise as described with FIGS. 22–28 and similar parts given corresponding numbers.

VARIATIONS OF CAM-TRACK SIDE TRANSFER

Referring to FIGS. 41–55 for details of another cam operated side transfer car 26A. This car has two telescoping for transfer devices 32A each for a 20 foot or both for a 35 or 40 foot container. Each transfer device has a top fork frame 276A and lower frame 280A each of same shape and size telescoping to extend under the container or trailer and miss the trailer wheels and any accessories carried on the bottom. Arms of the top frame are formed of two channels 402 spaced apart and connected by cross members 403 and top plate 404. Locating pins 304' extend above plate 404 to engage in holes in bottom of the container or trailer or other nonslip means are provided for engaging bottom of container. Two lift cylinders 406 are secured between the channels 402 with rods extending up and tapered to form pin 304' and a disk 408 secured horizontal on each cylinder rod below the taper to lift the container when the car is stationary as for loading and unloading the station car along side the station track as in FIG. 69. Hydraulic cylinders 406 are connected by hoses and fittings to valve 410 to tank or pump 412 driven by coupling to portable air or electric motor or other means.

Each of the lower arms of the transfer device are made of channels 414 turned legs in to form a track for flanged wheels 416 bearing mounted in brackets 418 secured depending from the back of the upper channels 402, and forward flanged wheels 416 bearing mounted between channels 414 for supporting and guiding the front end of the upper channels. The lower arms are each supported at the back on wheels 416 bearing mounted in brackets 418 depending from the intermediate channels 414 and roll between on facing channels 420 secured transversely to the bed or frame of car 26A. Lower arms are each supported at front on flanged wheels 416 each mounted in an upstanding pedestal 422 secured to the bed or frame of the car.

The upper and lower transfer arms are extended and retracted in the ratio of two to one by telescoping torque arm actuators 424 each comprising a central outer sleave 426 and two inner tubes, channels or bars 428 and 430 which slide or are roller mounted to roll in the outer sleave. The outer sleave is preferably a rectangular tube 426 trunion mounted at 432 to bottom of and between channels of the lower arm. The top of the inner bar 428 is pivotally secured between channels 402 of the upper arm and extends down to slide within the middle rectangular tube 430 which slides in outer sleave 426 and extends down therefrom to shaft 434 secured at the bottom of arm 424 to throw the arm through an arc to extend or retract the transfer device.

Shaft 434 extends lengthwise the car and is rotated by a cam track follower 34A to extend and retract the transfer devices in synchronism. The actuators 424 operate between the channels of the arms which protect them and keep the width of the arms with actuators down to provide more room for trailer wheels and accessories mounted on the bottom of the trailers. Actuators 424 can be made with bronze plugs 436 riveted in holes in middle tube 430 to slide on the outer and inner members of the actuator, FIG. 47, to reduce friction and wear.

Shaft 434 is in two lengths connected by a spur gear 438 free to turn on ends of both shaft lengths and having a clutch 440 secured on each side to connect the spur gear to turn neither, either or both shaft lengths. Gear 438 is clutched to either or both shaft lengths to operate either or both transfer devices. Gear 438 is driven by a track cam rider 34A.

The cam rider 34A has two double flanged wheels 261 which ride cam rail 260A. Wheels 261 are bearing mounted between ends of side plates 318 pivotally mounted in the middle on transverse pin 320 to inner column 316 which slips in outer column 324 on spring 442. Tubes 316 and 324 are connected by transverse pin 326 secured to tube 316 and extending through diametrically opposite semicircular holes in tube 324 with clearance so that spring 442 biases wheels 261 to a position parallel the car but permits turning with cam rail 36A. Tube 324 is secured between transverse horizontal channels 444 connected by gear rack 446 engaging the top of gear 438 to extend and retract the transfer devices.

The cam rider is supported at the back on flanged wheels 448 on shaft 449 bearing mounted to the frame of car 26A, FIG. 49, and supported on gear 438 at the front and held down by flanged wheels 452 riding on top of channels 444 on shaft bearing mounted in brackets 454 secured to the frame of car 26A to support the side of the car on cam rider 34A.

Clutches 440 connecting gear 438 with shafts 434 preferably have a cylindrical clutch face 456 integral on each face of gear 438 over which is slipped a hollow cylinder 458 secured on the shaft 434. A pin 460 connects the outer and inner cylinders of each clutch when pressed in. The pin is forced out of the inner cylinder by a spring 462 forcing a stepped plug 464 outward to fill up a stepped hole in the inner cylinder as seen in FIG. 53. Pin 460 then extends out from the outer cylinder and in just to the inner cylinder. Pin 460 is inserted partway in the inner cylinder by a headed pin 466 when pushed by the rod of a cylinder 468 on car 18, FIGS. 43, 49, and 54. Pin 460 is slip mounted in bracket 470 secured to the frame of car 26A. Pins 460 can only be inserted into the inner cylinder when the transfer devices are in retracted position and the cam track rider is in fully in position, aligning the pin's holes in the inner and outer clutch cylinders. A cover 472 secured to the frame of the car fits closely over each outer cylinder to prevent the pin 460 from disengaging the hole in the inner cylinder when the outer cylinder is turned from retracted position of the transfer device. The pin 460 locks the transfer device in retracted position between shield 472 and a protrusion on bracket 470 except when pin 460 is pushed in as when the pedestal car extends ram 468 signaling for transfer. This prevents the pin from comming out during transfer until the cam follower is returned in, thus assuring that any transfer devices will be returned with the cam follower to retracted position.

The head on pin 466 gives a large surface for ram 468 to engage to insert pin 460 against spring 462 to connect the inner and outer cylinders of clutch 440. Two ram cylinders 468 are secured under the frame of pedestal car 18 on each transfer side and separately controlled by air to extend when transfer is required for that berth when coupled with the station car. Rams 468 each spaced to engage a pin 466 are extended for the duration of the transfer run.

Though the cam rider supports much of the off balance load during transfer, a hold down wheel 354 on the opposite side of car is added. Wheel 354 is rotatably secured on bracket 356 to the car frame at center of the side of the car to roll on bottom of top leg of channel rail 358 secured on post 360 firmly embedded in concrete in the ground to take the upward force of the unbalanced load during transfer.

Referring to FIG. 56, the cam rider need not operate the transfer devices directly but can control cam valve 474 controlling air to double acting cylinder 476 whose rod carries gear rack 478 to turn gear 438 or, for four container car 18', drives a gear 480 secured on shaft 481 connected by spur gear 484 secured at each end engaging gear 438 between the shaft ends of the two transfer devices at each end.

FIG. 57 shows pins 466 on car 26A with a slip yoke 486 connecting the pins which have enlarged ends to hold the yoke from sliding off. Yoke 486 is secured central to rod end of a central pin 466C to be extended in when a long container is to be transferred by both transfer devices to insure both pins 460 are inserted in the two clutches 440 for these transfers of long loads. Pins 466 and 466C are controlled by rams 468 and 488 controlled through solenoid valves 198 and 200 respectively (see FIG. 13) to extend with AIR pressure and retract by spring within the ram cylinder to engage pins 460 for transfer.

CAR FOR TRANSFER ON BOTH SIDES

The transfer device 32B, FIGS. 58–63, transfer from either side of car 26B. Each transfer device 32B has two arms 490 which extend under a container on either side, an intermediate guide 492 under each arm 490 supporting the arm on rollers 494, and a supporting guide 496 secured to the bed of car 26B for supporting the guide 492 on rollers 494. Rollers 494 are secured to the intermediate guide on pins 500 as seen in section FIG. 61. Each top arm 490 is a rectangular channel turned legs down with ends turned in to form a track along each side of opening along center of bottom. Each supporting guide 496 has two channels 502 turned legs in. Each intermediate guide 492 has two deep channels 504 turned legs out at top into arm 490 and at bottom into supporting guide channel 502. Rollers 494 secured on ends of shafts 500 connecting channels 504 and extending through and out each end for mounting rollers 494 between legs of the guide channels to separate arm 490 from supporting guide 492 and rollers 494 mounted facing out along channels 492 to roll in channels 496 on each side to hold the guides parallel for extending and retracting the arms easily.

Arms 490 are extended and retracted from either side of car 26B by rotation of shaft 434' and a double-acting cylinder 510 having an outer collar 512 trunion mounted at 513 between the channels of the intermediate guide to slide out and in along the cylinder. The head end of cylinder 510 is secured on shaft 434' by slip key 514 to be rotated after the shaft turns about 12 degrees from center either way. The rod end of cylinder 510 has an eye in which shaft 516 is bearing mounted with a spur gear 518 on each end to ride a gear rack 520 on each side under top of arm 490, and each gear 518 also rides a rack 522 on top of each intermediate channel 504 to extend the arms twice the distance gears 518 roll on the intermediate guide channels 504.

A rotary reversing valve 524 and a double concentric rotary reversing valve 526 are both secured around shaft 434' to control cylinder 510 with movement of shaft 434'. The rod and head ends of cylinder 510 are connected by hoses 528 and 529 to respectively top and bottom ports of valve 524, FIG. 62. Sleave 512 has a slot for hose to rod end. Valve 524 has a vane secured to turn with shaft 434' dividing the valve into two chambers. Valve 524 makes connections to valve 526 according to the side of the car the transfer device is extending from (ie. the direction shaft 434' is turned, clockwise for right and vice-versa) and is bypassed for about 10 degrees each side of center by passage 532 at each end of the vane when in center (horizontal) position.

Valve 526 has an inner rotary sleeve 536 secured on shaft 434', an outer rotary sleeve 538 slip fit on sleeve 536 to have limited rotation thereon and an outer housing 540 slip fit closely on sleeve 538. The inner sleeve has a key pin 542 extending into a pocket in the outer sleeve which lets pin 542 travel about 15 degrees each side of center position to turn the valve on before engaging the outer sleeve to rotate the valve in the "on" position as shaft 434' continues to turn. The outer sleeve has four external circumferential grooves 551, 552, 553 and 554 connected respectively to left and right side ports of valve 524, AIR, and exhaust through the housing 540 in all positions of the valve. The inner sleeve has three pockets: center pocket 556 at top connected by passages in the outer sleeve to AIR in all positions and to left or right side ports of valve 524 only when valve is rotated about 10–15 degrees or more to left or right of center respectively, and pockets 557 and 558 at left and right connected by passages in outer sleeve and housing to exhaust in all positions of valve 526.

When shaft 434' is turned clockwise the inner sleeve is rotated in the outer sleeve about 15 degrees before pin 542 hits left wall of its pocket in which position valve 524 is exhausting and the center pocket 556 connects AIR only to left port of valve 524 whose vane has likewise turned closing its bypass and connecting the pressure to head of cylinders 510 and exhausting the rod ends to extend cylinders 510 and arms 490 to the left. The turning of shaft 434' beyond 12 degrees turns cylinder 510 which applies force at first substantially horizontally along arms 490 and guides 492 to extend the transfer device. As cylinders 510 are swung to either side their force on arms 490 is increasingly downward, therefore cylinder 510 is pressured to overbalance this downward force from shaft 434' to extend arms 490 all the way while synchronized by shaft 434' without binding or overloading shaft 434' or exerting excessive bending torque on cylinder 510.

When rotation of shaft 434' reverses by the cam track or otherwise to return the transfer device, shaft 434' slips in bearing before key 514 engages to swing the cylinder 510 with the shaft. This slip rotates inner sleeve 536 until pin 542 hits the opposite end of its pocket reversing valve 526 to pressure the rod end of cylinders 510 to return the transfer device or devices with shaft 434' synchronizing the transfer arms. Cylinders 510 start to retract arms 490 before shaft 434' exerts much upward torque on cylinders 510 to prevent binding. Valve 524 reverses air and exhaust connections for transfer from the opposite side when turned in the opposite direction from center, whereas valve 526 reverses cylinder 510 when shaft 434' reverses its direction of turning in extended position of the transfer device. The device transfers similarly to or from either side.

The cam track 36B for car 26B stays between and at a higher elevation than the rails of track ST or T to eliminate cam rail crossings or so the cam riders 34B need not be lifted to clear the railway track or grade crossings. The cam track 36B is displaced with gradual curve from center to either side toward a track T and back but remains between rails of track for car 26B to extend the transfer devices the full correct distance for container transfer on either side.

The cam rider 34B has a structural frame 560 straddling shaft 434' as the rider moves to either side of car 26B. The rider frame is suspended to slide on two transverse bars 562 secured between sides of frame of car 26B as wheels 261 between plate 318 pivotally secured on transverse pin 320 to column 316 secured to frame 560 are guided along the cam track from center to either side and back. A gear rack 564 is secured across top of frame 560 and engages a spur gear segment 566 secured on shaft 434' to rotate shaft with movement of the rider.

The segment gear 566 is preferably connected by a pin-clutch 440 to a shaft 434' as disclosed with FIGS. 53–55 to selectively control either or both transfer devices on car 26B to operate when shaft 434' is rotated. Where car 26B is stationary and its cam rider free of the cam track the cam rider can be pushed toward either side to start the transfer device operating to extend all the way out, and (after lifting or lowering the arms) the cam rider can be pulled back to turn shaft 434' a few degrees to reverse valve 526 to reverse cylinder 510 to return the transfer arms to retracted position. Or a section of the cam rail with rider thereon can be movable as by mounting on a short version of the cam track shifter, FIGS. 33–35, to shift the cam rail under the rider to actuate the transfer device for stationary transfer. The transfer device is preferably held in center retracted position when rider is not on a cam track.

Car 26B is suported from tipping and is tilted to lift a load on arms 490 by hydraulic cylinders 576 which lift and lower rollers 354' secured on their rod ends to align and roll on a rail 358 along each side of the car from which transfer is to be made therealong. Cylinder 576 is controlled by valve 580 operated either by hand for transfer when the car is stationary or by the control circuit FIG. 63 to lift arms 490 along the transfer run similar as would the change in elevation 44, which it is an object of this circuit to replace wherever the change in track elevation 44 is less desired. By eliminating this change in elevation, transfers can be made either to or from the train passing a single transfer run either direction.

TRANSFER ARM LIFT CONTROLS

The change in elevation along the cam and station tracks to effect lift of container to transfer to or from car in train moving by can be eliminated with the control circuit shown in FIG. 63 to control lift cylinders 576, 406, or 352.

Valve 580 for controlling any of these cylinders is controlled by a circuit from positive of battery 104, normally closed limit switch 582 opened when telescoping arms 490 etc. are fully retracted but closed when the rider starts on the cam track transfer curve (usually outward), line 584, lower front contacts of three-coil relay 586, solenoid of valve 580 to ground. Three-coil relay 586 is lifted to energize valve 580 after empty transfer arms are extended to lift off a container by circuit from line 584, normally open contacts of stick limit switch 588 closed when transfer arms are fully extended, stick coil of limit switch 588, normally closed contacts of limit switch 590 on arm of transfer device to detect when empty, back contacts of three-coil relay 586, top coil of stick relay 592 to ground, lifting relay 592, closing holding circuit from line 584, top front contacts and lower coil of relay 592 to ground, closing a circuit from line 584, lower front contacts of stick relay 592, back contacts of stick relay 594, center coil of relay 586 in series to ground, lifting relay 586, closing circuit from line 584, front contacts of relay 586, 406, or 576 to ground, connecting hydraulic pressure from pump P to head end cylinders 352 to lift load with the arms extended. When the transfer arms start back with load a circuit is completed from line 584, normally closed contacts of limit switch 588, top front contacts and lower hold coil of relay 586 which holds relay 586 closed when relay 594 lifts until limit switch 582 is opened when arms are fully retracted.

Three-coil relay 586 is lifted to energize valve 580 to extend load out for transfer off by circuit from positive of battery 104, limit switch 582 closed after arms are extended slightly, line 584, normally closed contacts of limit switch 588, line 596, top front contacts and lower coil of relay 586 to ground, closing circuit to solenoid of valve 580 to lift transfer arms as they are extended. A circuit is also closed from line 596, normally open contacts of limit switch 590 closed by load on the transfer device, top coil of relay 586 in parallel with choke coil and top coil of stick relay 594 to ground, closing holding circuit from line 584, front contacts and holding coil of relay 594 to ground. When transfer device is fully extended limit switch 588 opens circuits to top and bottom coils of relay 586 while relay 594 prevents closing of center coil of relay 586, dropping relay 586, reversing valve 580 to exhaust lift cylinders to lower the transfer arms to set load down on support. Limit switch 588 then closes circuit from line 584, normally open contacts and hold coil of limit switch 588, normally closed contacts of switch 590 after load is supported above the transfer arms, back contacts of relay 586, top coil of relay 592 which closes its hold circuit, but relay 586 continues dropped by relay 594 opening circuit to middle coil, and when the transfer arms are retracted limit switch 588 does not close normally closed contacts, since its hold coil holds the limit switch in, opening circuits to top and bottom coils, preventing relay 587 from being energized. Relay 594 is held until limit switch 582 is opened when the empty arms are fully retracted.

TRANSFER RUN LIFTS

Cam riders 34A and 34B are not hinged to the car as are riders 34 and 34LR. Therefore when riders 34A or 34B are lifted by their cam tracks they tilt or try to tilt the car on its trucks. Spring 442 will take up some of this rise. Therefore and to prevent unstable loading on these riders the station track is depended on to give the transfer lift, and the cam track has corresponding lift to keep the rider on its track without carrying too much of the weight.

If station track rises 44 are used for lifting containers rather than lift cylinders in the transfer devices 32A and 32B the rises are preferably in two or more separate slopes explained with FIGS. 64-66 to first take up slack and release latch-downs with the first rise before lifting off the containter with the second rise. The required lift of the transfer arms is labled "LIFT" in FIG. 64. The top of the transfer arms extend under the container at height indicated by solid line to base of latch down catch LC. The "LIFT" includes "CLEARANCE" according to variations in the cars, springs and track deflection with different loading, tilt tolerance of the cars etc. and "RELEASE" to lift rod or tube 604 connecting all latches LD on each side to open them together and engage transfer arm or arms against bottom of container, and "LIFT-OFF" to raise the container above catches LC. The "LIFT" of the station track and cam track are worked out as shown in FIGS. 65 and 66 for respectively a single and double rise in station track ST.

The lift of the station track can be in one incline 44, FIG. 65. The cam track profile as required for this lift is found by drawing wheels 261 representing the cam rider under load at center of side of car 26A at height with trucks at points of change of track slope. This gives the cam wheel 261 positions shown for wheel positions W representing the centers of truck 28 of the car 26A. Tangent points of wheels 261 with the cam track are connected by straight line to give the general profile of cam track 34 with two lifts 4401 and 4402. The lift-off of the containter 22F is then drawn showing the transfer arms 38A, the arm at right doing all the lifting.

The lift should be in two or more parts, the first to take up the "CLEARANCE" and "RELEASE" the latches thus bringing all transfer arms 38A into contact with the bottom of the container or trailer before the lifting is started and the second lift of tracks ST for "LIFT-OFF" with all transfer arms supporting the load. This is plotted out as in FIG. 66 similarly as for FIG. 65 but dividing the total lift into the two separate lifts starting truck centers apart, the second lift being twice as long as the first lift and of equal slope. The rear truck completes the first rise before the first truck starts the second rise to bring all arms 38A in contact with bottom of containers before lifting off on the second rise. Each time a truck of car 26A rises the cam track 36A rises half that height. The cam track 36A therefore has the three rises shown.

Referring to FIG. 67 where container 20F is being lowered by gantry crane to storage pedestals 46 each having a ctach LC spaced to engage a latch LD in alignment box 610 on underside of the container. Latches LD are held open by hooks 612 of the hoist engaging under bars 604 connecting the opening ends of levers on the latches on each side as in my U.S. Pat. Nos. 3,528,569 and 3,677,194.

Electrical connections can be made to the container by a cylindrical connector 614 which extends up and down on an extension of a pedestal 46 to engage in one of two insert connectors 616 in the bottom of the container to make electrical contacts around the periphery of the cylinder similar as in my U.S. Pat. No. 3,037,462. The cylinder is forced out of its housing up into a connector 616 by lever 618 engaged by the container when set down and is retracted into the housing when the container is lifted off to protect the contacts from water and ice (See my U.S. Pat. No. 3,483,829).

FURTHER APPLICATIONS OF THE TRANSFER DEVICE

The transfer devices 32 etc. can be utilized in different ways around the station as seen in FIGS. 68-71. FIG. 68 shows transfer device 32A applied to a roadway vehicle 620. The counterbalance wheel 354 and track 358 are provided, but the cam track is omitted since the vehicles are standing during transfer. Cylinder 510 operates arms 38A to extend and retract, and cylinders 406 lift or lower the container on arms 38A. The transfer device can lift a trailer from a driveway or set it down as shown in FIG. 69 or set a container or trailer on storage pedestals 46, FIG. 70, along side the station track as at the station FIG. 12 or lift containers off pedestal car 18, FIG. 71, having pedestals 46 or other support so arms can reach under the container to lift.

A FURTHER VARIATION OF THE SIDE TRANSFER DEVICE

Referring to FIGS. 72-77 for a variation of the side transfer device, station car 260 has two double parallelogram side transfer devices 320 each for a 20 foot or both for a 35 or 40 foot container 20F or 22F or trailer. Each transfer device has a fork frame 276C with arms 38C for extending under and supporting a container. Frame 276C is mounted on a double parallelogram linkage 628 at each end of frame 276C on the opposite side of car 26C from which the linkage extends arm 38C. Linkages 628 are to one side of the container so containers of various lengths can be handled. These linkages hold frame 276C horizontal or parallel the bed of the car. Frame 276C is supported on a lower forked coinciding frame 280C which extends and retracts part way to support frame 276C.

Arms 38C are each a square tubing or channel legs down and tapered off to front with a roller 630 mounted between the sides, FIGS. 75, at back. Arms 38C are connected by two square tubes 632 spaced apart along the back to form a sturdy fork for heavy loads. The intermediate guide, U-frame 280C, is of square tubing with a square bar 634 along each top edge of its arms to guide roller 630. Two pairs of flanged wheels 636 mounted on ends of a short shaft through a pendant bar 638 depending at middle and at rear from each arm of frame 2800 supports the frame to roll between transverse channels 640 secured to top of bed of car 26C to guide the arms.

Two actuating shafts 434, one for each transfer device, run in line lengthwise the vehicle 26C, are bearing mounted through holes in channels 640, and have a spur gear 438 concentric therebetween with a key pin clutch 440 on each gear face to drive neither, either or both shafts 434. Shafts 434 each have two spur gears 646 secured thereon each engaging a gear rack 648 secured along bottom of the lower fork arms of frame 280C from front extending about a third of distance to rear to shift the lower fork out and in when shaft 434 is turned by the cam rider 34C. A bar 650 is pivotally connected at ends between the back link of linkage 628 and extension 652 from each end of lower frame 280C to extend and retract the double parallelogram about three times the distance frame 280C is extended and retracted by the cam track 36A. Cam track rider 34A has a rectangular tube 654 with wheels 656 along each side to roll in channels 658 supported transversely on tubes up from bed of car 26C on each side of gear 438 to guide the rider linearly so a gear rack 446 secured along bottom of tube 654 turns gear 438 when the rider follows the cam track 36A out and back. Pins 466 engage either clutch 440 to turn either or both shafts 434 selectively as described with FIGS. 52-55 as the car travels with car for transfer of load along transfer run along track 36A.

DOUBLE RUN CAM TRACK LIFTS AND RIDERS

The two successive transfer runs TRL and TRR, FIG. 78, for stations such as FIGS. 1, 6, and 10-12 in plan can have identical curves to extend and retract the transfer arms, but in profile runs TRL and TRR are different for two cam riders to each simultaneously operate a transfer device, since each of the two cam riders runs on different cam rails and the cars for each run are made interchangeable. Each transfer run has inclines 44 and 44LR in sequence left to right for respectively cam rail 260 and 260L and/or 260R for respectively the cam rider 34 and 34LR at left and right hand ends of the transfer cars 26 which are turned the same way on each transfer run and useable on either run. These inclines are spaced cam rider centers distance apart to simultaneously lift the transfer arms to lift load off railway car passing first run TRL or TRR according to direction of train movement and lower the arms of another transfer car 26 with container to set on train passing second transfer run TRR of TRL.

For movement left to right, FIG. 78, two cam riders 34 and 34LR on a transfer car 26 on run TRL are simultaneously lifting to unload a load from a moving vehicle and similarly two cam riders 34 and 34LR on another transfer car 26 on run TRR on slopes 44 and 44R are shown simultaneously lowering to set a load on the train or vehicle. The cam tracks are higher from center of station out to those slopes than beyond. The cam rider at right-hand end of each car 26 has a double flanged cam wheel 261, FIG. 80, central on a shaft 319 at each end of rider to lift on rail 260 and pass between rails 260L and 260R. Cam rider 34LR at left has two cam wheels 261, FIGS. 81-83 spaced about a wheel width apart on a shaft 319 between side plates 318 at each end to let rail 260 pass between on slope 44, FIG. 81, on second transfer run for train from left but lifts and lowers on slopes 44LR FIG. 82.

The transfer run at left of FIG. 78, FIG. 79, has outer rails 260L and 260R with slope 44LR starting at cam rider centers distance in advance of the equal slope 44 in center cam rail 260. The transfer run at right of FIG. 78, FIG. 83, has the center cam rail slope 44 at cam rider centers distance ahead of the equal slope 44LR in outer rails. Thus a section through the cam track between the slopes 44 and 44LR for transfer run at left appears as in FIG. 80 and for run at right is as in FIG. 81.

The cam track 36, FIG. 78, from left to right has rails 260R and 260 extending out with curve to right, rail 260R a cam rider spacing before rail 260 and rail 260R starting with slope to lightly higher than rail 260 so flanges of wheel 261 at left clear over rail 260 as rail 260R curves out therefrom and as rail 260 reparallels rail 260R further ahead. Then where transfer arms are fully extended, rail 260R lifts cam truck 34LR for lifting arms of rear transfer device as rail 260 a cam rider centers distance beyond lifts truck 34 up simultaneously. Thereat or beyond rail 260L rises to height of rail 260R to left of rail 260, and rail 260R thereafter descands and ends. Rail 260L curves back from left side of rail 260 slightly higher than rail 260 for flange clearance. Rail 260 curves back cam rider centers distance beyond rail 260L approaching rail 260L a flange clearance distance below. The cam track runs the same for the transfer run TRR at right except rails 260 and 260R slope down instead of up at same spacing (cam centers) and relative locations as for transfer run at left.

The transfer runs preferably have the transfer rise 44LR in both rails 260L and 260R to better carry the load up. This rise along the extended portion is about 4-6 inches full scale. For transfer run at left, FIG. 79, rails 260L and 260R run at this height above rail 260 for a cam rider centers distance before rail 260 also rises so wheels of first cam truck 34 on rail 260 run between rails 260L and 260R until both cam riders 34 and 34LR are lifted simultaneously by rails 260 and 260L and/or 260R when running left to right. The second transfer run for movement left to right shown at right in FIG. 78 and shown larger in FIG. 83 has a dip 44LR in rails 260R and/or 260L along where the cam track is fully extended leaving rail 260 about 4-6 inches higher than rails 260L and 260R for cam rider centers distance before the dip 44 in rail 260 down to level of rails 260L and 260R to lower the transfer arms simultaneously to set load on car in train. Referring to FIG. 84, cam track 36' is shown higher than station track ST at a gap 670 where cam trucks 34''' cross. Cam trucks 34''' have three wheels 261 or 263 in line to support and align the truck in bridging the gap. Two of the rider's wheels align the third in crossing the gap in track 36' and save the need to groove track ST for the cam wheel flanges to cross. With the truck wheels above track ST there is no need to lift the rider even where there is no cam track. Side plates 318' of truck 34''' are triangular and symetrical about central axis through pin 320 above center wheel of the truck.

PASSENGER TYPE CONTAINER TRANSFER CARS

Referring to FIG. 85, the preferred passenger containers are set in bertb 672 on one side of car 14 having enclosed aisle 674 along other side with partition 676 and sliding doors 678 separating the container area from the aisle as in my U.S. Pat. No. 3,416,684, FIGS. 4, 5, and 15. Car 14 has pedestals 46P or depressions so fork arms 38P can extend under the container 16 with clearance. The passenger container transfer devices 32P therefore do not extend as far as the freight transfer devices but can otherwise be the same. To operate over the same cam track as the freight transfer devices the arms 38P are geared not to move out as far as arms 38.

FIGS. 83 and 85 show the preferred transfer device for selectively handling passenger containers over the cam track 36 that also operates transfer devices for freight. Cam riders 34P have square tubing 444' connected at right angles to column 324 and supported and guided by flanged wheels 290 supported from frame of car 26P. A gear rack 446 along bottom of tube 444' is engaged with a spur gear 438 loose on shaft 434 to which it is connected by a key pin clutch 440. Each shaft 434 has two spur gears 686 each engaging a gear rack 688 on bottom of intermediate arms 282 to extend half the distance that arms 38P are to extend by rope 298 about rollers 288 on sides of the intermediate arms. The guide frames 276 and 280 are of same construction as in FIGS. 24-28 or 29 with rack 688 added and cam rider 34P separated to drive shaft 434. Clutches 440 are engaged as described with FIGS. 13 and 49-55 and rams 468 extended therefore only when a container is ready and safe for transfer by circuits as on FIG. 13 with addition of check that doors are locked closed as in my U.S. Pat. No. 3,484,002. While each cam rider 34P operates one transfer device, one could operate two, and these can be controlled by rams 468 extended from car 14 as for car 18 to insert key pins 464 for transfer after side coupling at start of transfer run.

DUMP TRANSFER CAR

Referring back to FIG. 83, shaft 434 can operate other devices than the transfer arms. It can have gears 686 engaging gear racks 688 on sliding dump doors 690 or rotary dump means for unloading bulk goods as train moves among a cam track 36 from which slopes 44 and 44LR can be omitted.

ENCLOSED PASSENGER TRANSFER CAR

Referring to FIGS. 86-88, the station cars 26P can be enclosed as 26P' for use in trains before and after transfer or self-propelled for local run connecting to train or in train for transfer to a car 14. Such a car is also suited for mail, express, baggage, etc. Station car 26P' on tracks ST is shown side coupled to passenger car 14, FIGS. 86 and 88. Cars 26P' and 14 each have an aisle 674 on one side past a container berth 672, a partition 676 separates the aisle from the berth. Doors 678 in partition 676 align doors 692 in opposite sides of container 16. The doors 678 and 692 are controlled similarly as elevator hatch doors and closed and held to close circuit for side coupling the waiting station car. A circuit is from positive of battery 72, door switches 694 closed when doors 678 and 692 are locked closed, switch 696 closed by the conductor or trip reader when the container is to be transferred out, cam switch 76 under the car closed by ramp 80 when the coupling should extend, inductor 84 to ground of battery 72. Inductor 84 throws switch 90 to signal station car to pressure cylinders 65 to extend couplings 64 on car 26P' as in FIG. 2 to engage latch block 57 on car 14 to move car 26P' in alignment for container transfer along the transfer run.

Station car 26P' has in berth 672 a transfer device 32P' which is extended by a cam rider 34A' to reach under container 16 on car 14 and lift by the rise of track 36A, FIG. 43. This transfer device shown in FIGS. 86-93 has fork frame 276' extending its arms 38P' under container 16 on car 14, FIG. 88. Arms 38P' extend into a recess in the floor of car 14 under bars 604 of latches LD in boxes 610 secured on the bottom of the container latched on catches LC secured to the floor of car 14. Arms 38P' are connected at back by square tubing to form frame 276'. A vertical bracket 700 extends up from each arm at back and has brace 702 run from its top down and out to arm 38P'. A vertical channel track 704 is secured to car 26P' at opposite ends of the berth. Channels 704 have an angle V-rail 706 on the inside of each leg running lengthwise thereon. A vertical sliding block 708 has V-grooves in sides to slide between angles 706 on channel 704. Block 708 has a top and bottom pivot pin 710 to which is connected parallelogram links 712 and 713 to respectively a top and bottom pin 714 on bracket 700. Links 712 and 713 secured to each block 708 swing in parallel adjacent planes to pass each other, the upper link being inward with respect to the lower as seen in FIG. 91. This linkage maintains arms 38P' parallel the floor of car 26P'.

Each arm 38P' is made of two channels 402' faced out with gear rack 688' turned teeth down secured lengthwise therebetween. Each rack 688' is supported on a gear 686' secured on a shaft 434' connecting the gears on each end of the transfer device. A smaller gear 438' is secured to the outer face of each gear 686'. Gears 438' each roll on lower rack 716 secured transversely to the frame of car 26P'.

a cam rider 34A' is secured to a sleave 718 about shaft 434' to slide in and out from the side of car 26P' to roll gears 438' and 686' to extend and retract arms 38P'. Rider 34A' has a column 324 secured at right angles to a T-bar 720 which slides in grooves between angles 722 and 724 transversely on car 26P'. Tube 718 is secured through a hole in the T-bar to move therewith gears 434' and 686'. Arms 38P' move out and in over three times the distance of the cam follower depending on the gear ratio (gear 686'/ gear 438' × 2 × rider extension = transfer arm extension). The geat ratio is selected so arms 38P' will extend the correct distance for the cam track displacement and spacing between tracks ST and T. The back of legs 38P' extends into pockets under the floor of aisle 674 when arms 38P' are retracted into car 26P' as shown in phantom, FIG. 88. The parallelogram arms 712 and 713 lift and then lower blocks 708 as the arms move in and out from car 26P'. The cam track rider 34A' is like rider 34A to run on cam track 36A so car 26P' can operate on the same station tracks as the freight transfer cars 26A. The cam track is higher than the station track so that the rider need not be lifted and lowered and can cross over switches etc.

GANTRY CRANE

Referring to FIGS. 94 and 95, crane 24 is supported by and connected to a gantry G to run over storage spots and run off the gantry onto elevated track bridges CB over the driveway or railway for the vehicle 26 or 18 that is to be loaded or unloaded so the gantry does not cross the vehicle's way, thus reducing interference with the vehicle's movement.

Bridge CB for each rail of the crane is in form of a sawhorse with a rail of CT along top and straddles track with clearance for railroad cars.

Gantry G has a frame of two H-beam legs 730 connected by H-beam 732 across each end to form A-frame for each end connected by rectangular tube 734 at top and 736 on each side above height of containers in storage but below container lifted on crane 24. The bottoms of legs 730 of each A-frame are connected by channels 738 turned legs down with double flanged wheels 740 each mounted on a drive shaft 742 bearing mounted between the legs of channel 738 at each end to run on track GT. A channel 744 is secured legs down extending out each end on inward side of each A-frame end with a rail of track CT' along top to align and abut rail of track CT on bridges CB. The crane has a rectangular trussed bridge frame 750 with channels 752 run along bottom of ends legs down. Two double-flanged wheels 754 are bearing mounted between the legs of channel 752 to support each end of crane to roll on tracks CT and CT'. A rotary air cylinder 756 is mounted on top at center of member 734 with vertical shaft extended through member 734. Two arms 758 pivotally connected together at one end and other ends connected one to shaft of cylinder 756 and other to center over top of crane frame 750 so cylinder 756 extends the crane from the gantry off over bridges CB to center over car spotted under the craneway bridges and retracts the crane back onto the gantry.

Crane 24 has a vertical guide channel 760 secured at each end of frame 750 and extended down to clear over tops of containers in storage. A load spreader having a rectangular frame 764 is supported on one or more ropes 766 to each corner run up over sheaves 768 and directed to and around drums 770 on shaft 772 driven by gearmotor 774 to lift and lower the load spreader. The spreader has eight hooks 612 each at bottom of a hook column 776 to which ropes 766 are attached at top. Spreader frame 764 has a vertical channel 778 secured at each end interfitting channels 760 to guide the spreader vertically, FIG. 98.

The gantry is driven by motor GM mounted on bracket 780 to outside of an A-frame end. Motor GM drives worm gear 782 on shaft 784 bearing mounted along cross member 732 of the A-frame to beveled gears 786 and shaft 788 through tube 736 to the same gearing and shafts on opposite side to shafting 790 down each leg to beveled gearing 792 to drive shaft 742 and all wheels 740 of the gantry. The gantry can be controlled by an operator or other suitable means and should have interlocked controls to prevent operation while the crane is extended and to prevent extension of the crane from the gantry except when the gantry is at end of track GT against bridges CB where hose couplings 796 are engaged connecting pressure from AIR to cylinder 756 to rotate to extend arms 758 to carry the crane out on the bridges CB. After transfer using usual crane hoist controls, pressure to cylinder 756 is reversed by solenoid valve 798 to return crane 24 onto gantry against stops 800 closing limit switches 802 to enable the gantry to be operated. Solenoid valve 798 is energized to reverse through manual switch 804 and limit switch 806 that check that the crane hoist is raised. Air hoses part at quick disconnect couplings 796 and seal as the gantry leaves the bridges to run to a storage spot.

The cam riders can be used for such things as the opening and closing of dump doors on cars, for dumping dump cars, for any type of transfer device which can be actuated thereby while car is in motion or for control thereof.

Having thus described a few of many possible embodiments of my invention it should be understood that I do not wish to be limited to the forms disclosed but to all variations within the true spirit and scope of this invention as covered by the following claims.

I claim as my invention:

1. A first and a second track having at least one parallel running transfer run, at least a first and a second vehicle on respectively said first and second track, side transfer means on said first vehicle for extending over to said second vehicle to transfer a load, cam rider means on said first vehicle for operating said transfer means, a cam track extending aways along said first track for each said transfer run with lateral displacement and return for said cam rider means to guide on to displace laterally to extend said transfer means out over to said second vehicle and back to transfer a load to or from said first vehicle, and engaging-disengaging means for engaging a load on said second vehicle with said transfer device and for releasing a load from said transfer means to said second vehicle, and means for keeping said vehicles aligned while moving along said tracks for the transfer run.

2. A system as in claim 1, said engaging-disengaging means including lift means for picking up a load with said transfer means from said second vehicle so the transfer device can transfer a load either to or from said first vehicle in each direction of travel along said track.

3. A system as in claim 1, said engaging-disengaging means including a rise along said cam track where said transfer means is extended and for a distance until the transfer means is retracted for lifting a load from said second vehicle to said first vehicle when moving up the rise and for lifting a load over and setting it onto said second vehicle when traveling in the opposite direction.

4. A system as in claim 3, having two successive transfer runs each with cam track elevated from said read to adjacent ends of each, the first run according to direction of vehicle movement being for lifting a container off said second vehicle and the second run being for loading a container onto the second vehicle.

5. A system as in claim 1, said transfer means being two similar transfer devices, said cam rider means being a cam rider for each transfer device, said cam track having separate rails similarly curved at cam rider center distance apart for the simultaneous displacement of each cam rider, each said cam rider having distinguishing guide means for following only the one of the separate curves out and back for simultaneous extension and retraction of both said transfer devices for simultaneously handling a long load.

6. A system as in claim 5, each said rider having at least one cam wheel, the said wheel of said rider having a circumferential groove for tracking on a central cam rail, the said wheel on the other said rider having three concentric grooves for tracking on all the cam rails, the cam rails on each side of center having lifts for clearing the flange of the three grooved wheel over the central cam rail to switch only that rider off of the center cam rail.

7. A system as in claim 5, said distinguishing guide means being at least one wheel and axle set on each said rider, that on one rider being a double flanged wheel central on each wheel-axle set and on the other rider two double flanged wheels displaced equally from center about a wheel width apart for the cam rail for the other said rider to clear between.

8. A system as in claim 1, said transfer means being two similar transfer devices having two aligned shafts each for operating a said transfer device, said cam rider means having a gear rack which is moved by the displacement of the cam track when the first vehicle is moved along the transfer run, a gear engaging said rack and mounted between ends of said shafts, a key-pin clutch on each side face of said gear for turning neither, either or both of said shafts selectively to control transfer.

9. A system as in claim 1, and lift means for disengaging said rider means from said cam track and lifting to clear above said first track.

10. A system as in claim 1, said cam track being above said first track so said rider means clears said first track.

11. A system as in claim 10, said cam track crossing a rail of said first track with a gap at each crossing, said cam rider means being at least one cam track each with at least three wheel sets mounted in line in succession to span said gap.

12. A system as in claim 1, and means for extending and retracting said transfer means while said first vehicle is stationary.

13. A system as in claim 1 and a said first vehicle on said second track and a second vehicle on said first track and cam track means along said second track so a container can be transferred either way from either a said first or a said second vehicle according to direction of movement.

14. A system as in claim 1, said first vehicle having two of said cam rider means longitudinally spaced, said cam track having two successively equally spaced lateral displacements for operating said transfer means simultaneously.

15. A cam track as in claim 14 having a similar lift elevation along each spacing of the displacement spaced equal to the spacing of the displacements and therealong to simultaneously lift said devices when displaced to simultaneously transfer a load.

16. A load transfer device for use with a vehicle and a horizontally extending rail comprising: substantially horizontal telescoping arms including fixed, intermediate, and load bearing (arms) arm sections; mechanical means connecting the (arms) sections to one another so the fixed and load bearing sections telescope substantially equally and oppositely relative to said intermediate (arm) sections; pivot means for securing an end of each said fixed (arm) section to (a) said vehicle so the load lifting sections of the arms can swing up and down (on far end) for transfer of loads to and from the vehicle; and cam rider means connected to the intermediate (arms) sections to support and telescope the arms, said cam rider means having a swivel truck having wheels for running and guiding on (at least one) said rail to extend and retract the arms and a slope in said rail to lift said sections where extended to transfer a load.

17. A vehicle way having at least one vehicle thereon and a (A) loading device positioned along (a) said vehicle way for the transfer of loads to and from said vehicle (vehicles) moving along said way; said device including: a cam track spaced along said way, said track curving toward said way, thereafter slanting up to a higher elevation, then back away from said way at the higher elevation, a load engaging and support frame, vehicle means for supporting said frame including cam following means on said track for guiding said frame moveable along said track, and means for coupling said (frame) device to said vehicle (moving along the way whereby) for moving said frame laterally and vertically relative to said vehicle to engage and remove a load (is removed) from (a) the vehicle moving in direction described along said way or set a load on (a) that vehicle moving in reverse direction along the way past said device.

18. A (loading) vehicle way, at least one vehicle on said way, a load transfer device positioned along (a vehicle) said way for (the) transfer of loads from (and) or to (vehicles) said vehicle moving along (the) said way, said device including: at least one load support frame, a cam track spaced (along) laterally to said way, swivel truck means for supporting at least a portion of said frame on said track, (mens) means for side coupling the device with (a) said vehicle on said way in longitudinal alignment therewith for transfer (and to have the vehicle) to move the device (to transfer), said track including a cam rail for each said swivel truck means, said track curving toward said way to extend said device when moved therealong by said vehicle to align the support frame below a load on (a) the vehicle coupled on said way, each said cam rail having a slope up in alignment for lifting the load from the vehicle, and each said rail therefrom at this higher elevation curving back from said way to carry the load off from over the vehicle. (, and means for releasing the side coupling.)

19. A loading device positioned along a vehicle way for transfer of loads to or from vehicles moving along said way including: a cam track spaced along said way and curving toward said way as approached from each direction of said way; a rider moveable along said track; a load support frame; means for supporting said frame along side of said way (to move) for movement laterally as well as longitudinally (to translate to and from) with respect to said way and including trankway means for lifting said frame (while closest said way when said rider is between the outward curves of said cam track,) as it moves along the way, said rider being (connected) operative to (give translation motion to) translate said frame when said device is pushed by a vehicle moving along the way (passing) adjacent said cam track, whereby said frame is extended to the vehicle and lifted and retracted therefrom to transfer a load from said vehicle when moving in one direction or set a load on the vehicle when moving in the opposite direction.

20. A device as in claim 19, and a second cam track of similar configuration to the one described in claim 19, spaced therefrom along said way, a second cam rider thereon, said means for supporting said frame including these cam riders, said trackway means for lifting said frame being a slope in each track spaced to lift both ends of said frame substantially level.

21. A system as in claim 17, said frame being a fork for extending under a cargo container or trailer on said vehicle, and pedestal means on said vehicle for supporting the load for said fork to reach under it.

22. A combination as in claim 18, said vehicle being a pedestal car in a railway train to support the load for said frame to reach under to lift off.

* * * * *